(12) United States Patent
Ackermann et al.

(10) Patent No.: US 12,331,682 B2
(45) Date of Patent: Jun. 17, 2025

(54) PARTICULATE SEPARATOR ASSEMBLY FOR A GAS TURBINE ENGINE

(71) Applicant: RTX Corporation, Farmington, CT (US)

(72) Inventors: William K. Ackermann, East Hartford, CT (US); Andrew J. Murphy, Old Saybrook, CT (US); Marc J. Muldoon, Marlborough, CT (US); Michael G. McCaffrey, Windsor, CT (US); William J. Beeson, San Diego, CA (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/376,665

(22) Filed: Oct. 4, 2023

(65) Prior Publication Data

US 2025/0116225 A1   Apr. 10, 2025

(51) Int. Cl.
*F02C 7/052* (2006.01)
*F02C 9/18* (2006.01)

(52) U.S. Cl.
CPC ............... *F02C 7/052* (2013.01); *F02C 9/18* (2013.01); *F05D 2260/606* (2013.01); *F05D 2260/607* (2013.01)

(58) Field of Classification Search
CPC .... F02C 7/05; F02C 7/052; F02C 9/18; F05D 2260/606; F05D 2260/607; F01D 5/18; F01D 25/08; F01D 25/24
See application file for complete search history.

(56) References Cited

U.S. PATENT DOCUMENTS

| | | | |
|---|---|---|---|
| 4,309,147 A | 1/1982 | Koster | |
| 4,798,047 A | 1/1989 | Geary | |
| 6,308,511 B1 * | 10/2001 | Beeck | F01D 5/187 |
| | | | 415/115 |
| 7,284,953 B2 | 10/2007 | Silverman | |
| 8,087,249 B2 | 1/2012 | Ottaviano | |
| 11,326,516 B2 | 5/2022 | Barberger | |
| 2013/0192268 A1 * | 8/2013 | Sanchez | F02C 7/12 |
| | | | 415/182.1 |
| 2016/0045923 A1 * | 2/2016 | Correia | B01D 45/16 |
| | | | 55/392 |
| 2016/0245152 A1 * | 8/2016 | Thomassin | F02C 7/36 |
| 2019/0078514 A1 * | 3/2019 | Eastwood | F01D 11/24 |

* cited by examiner

*Primary Examiner* — Steven M Sutherland
(74) *Attorney, Agent, or Firm* — Getz Balich LLC

(57) ABSTRACT

An assembly for a gas turbine engine includes at least one rotational assembly, an engine static structure, a compressor, one or more compressed air loads, and a particulate separator assembly. The at least one rotational assembly includes a shaft, a bladed compressor rotor, and a bladed turbine rotor. The engine static structure includes an engine case assembly. The engine case assembly surrounds the at least one rotational assembly. The compressor includes the bladed compressor rotor. The compressor is configured to form a compressed air flow. The one or more compressed air loads are disposed within the engine case assembly. The particulate separator assembly includes a plurality of particulate separators. The plurality of particulate separators are disposed outside of the engine case assembly. The plurality of particulate separators are configured to separate particulate from the compressed air flow and direct the compressed air flow to the one or more compressed air loads.

18 Claims, 12 Drawing Sheets

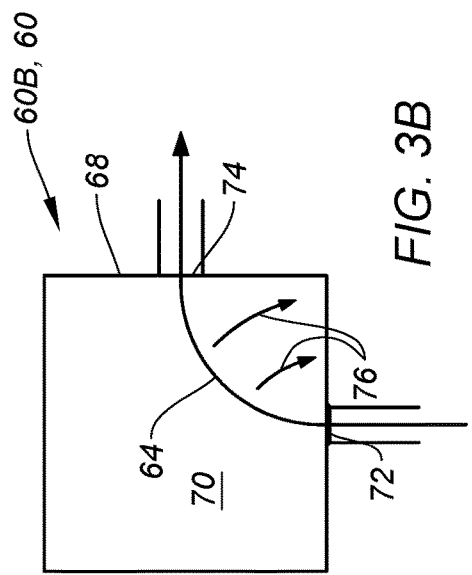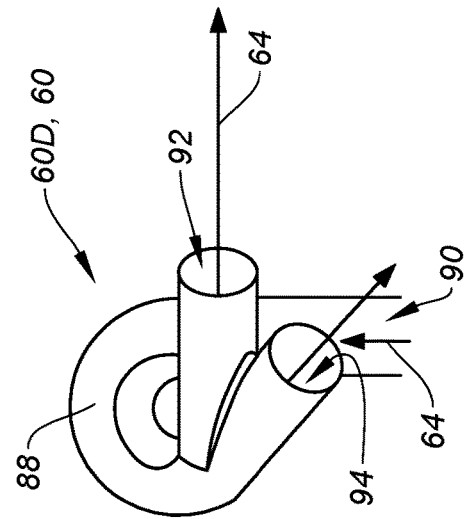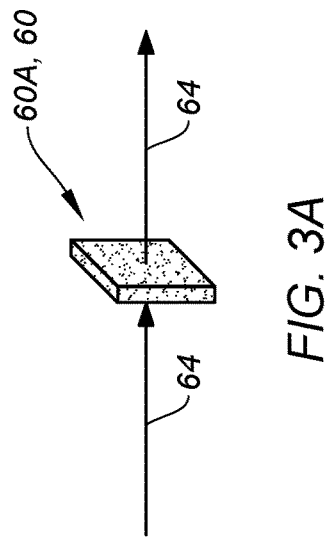

PARTICULATE SEPARATOR ASSEMBLY FOR A GAS TURBINE ENGINE

BACKGROUND

1. Technical Field

This disclosure relates generally to compressed air systems for gas turbine engines and, more particularly, to particulate separator assemblies for compressed air systems.

2. Background Information

Gas turbine engines, such as those used for aircraft propulsion, may use compressed air (e.g., bleed air from a compressor) for operation of one or more components of the gas turbine engine. Depending on the source of the compressed air, some amount of particulate may be present and may be entrained with or otherwise carried by the compressed air. Various systems and methods are known in the art for reducing the impact of particulate on gas turbine engine components. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an assembly for a gas turbine engine of an aircraft propulsion system includes at least one rotational assembly, an engine static structure, a compressor, one or more compressed air loads, and a particulate separator assembly. The at least one rotational assembly is configured for rotation about an axis. The at least one rotational assembly includes a shaft, a bladed compressor rotor, and a bladed turbine rotor. The shaft interconnects the bladed compressor rotor and the bladed turbine rotor. The engine static structure includes an engine case assembly. The engine case assembly extends circumferentially about the axis. The engine case assembly surrounds the at least one rotational assembly. The compressor includes the bladed compressor rotor. The compressor is configured to form a compressed air flow. The one or more compressed air loads are disposed within the engine case assembly. The one or more compressed air loads are connected in fluid communication with the compressor to receive the compressed air flow. The particulate separator assembly includes a plurality of particulate separators. The plurality of particulate separators are disposed outside of the engine case assembly. The plurality of particulate separators are connected in fluid communication with and between the compressor and the one or more compressed air loads. The plurality of particulate separators are configured to separate particulate from the compressed air flow and direct the compressed air flow to the one or more compressed air loads.

In any of the aspects or embodiments described above and herein, the particulate separator assembly further may further include a plurality of bypass valves. Each bypass valve of the plurality of bypass valves may be selectively positionable in an open position and a closed position. In the open position, each bypass valve may be configured to direct at least a portion of the compressed air flow to bypass a respective particulate separator of the plurality of particulate separators.

In any of the aspects or embodiments described above and herein, each particulate separator of the plurality of particulate separators may be a particulate air filter.

In any of the aspects or embodiments described above and herein, each particulate separator of the plurality of particulate separators may include a housing. The housing may form an inlet, an outlet, and a settling chamber between the inlet and the outlet.

In any of the aspects or embodiments described above and herein, each particulate separator of the plurality of particulate separators may include a housing. The housing may form an inlet, an outlet, and a serpentine passage between the inlet and the outlet.

In any of the aspects or embodiments described above and herein, each particulate separator of the plurality of particulate separators may include a curved conduit. The curved conduit may include an inlet, an inner diameter outlet, and an outer diameter outlet. The compressed air flow may be directed to the one or more compressed air loads from the inner diameter outlet.

In any of the aspects or embodiments described above and herein, the assembly may further include a combustor. The engine case assembly may include an outer diffuser case and an inner diffuser case. The outer diffuser case and the inner diffuser case may form an annular air plenum surrounding the combustor. The annular air plenum may include an outer plenum portion and an inner plenum portion. The outer plenum portion may be disposed radially outward of the combustor. The inner plenum portion may be disposed radially inward of the combustor. The plurality of particulate separators may be connected in fluid communication with the compressor through the outer plenum portion.

In any of the aspects or embodiments described above and herein, the assembly may further include a turbine including the bladed turbine rotor. The one or more compressed air loads may include a rotor blade stage of the bladed turbine rotor.

In any of the aspects or embodiments described above and herein, the assembly may further include a turbine including the bladed turbine rotor. The one or more compressed air loads may include a vane stage of the turbine.

In any of the aspects or embodiments described above and herein, the assembly may further include a turbine including the bladed turbine rotor. The one or more compressed air loads may include a blade outer air seal (BOAS) of the turbine for the bladed turbine rotor.

In any of the aspects or embodiments described above and herein, the outer diffuser case and the inner diffuser case may form an annular diffuser nozzle configured to direct the compressed air flow into the annular air plenum. The annular diffuser nozzle may include a plurality of hollow struts. The compressed air flow may be directed from the plurality of particulate separators to the one or more compressed air loads through the plurality of hollow struts.

In any of the aspects or embodiments described above and herein, the inner diffuser case may form an annular cavity separated from the annular air plenum. The compressed air flow may be directed from the plurality of hollow struts to the one or more compressed air loads through the annular cavity.

In any of the aspects or embodiments described above and herein, the compressor may direct the compressed air flow to the plurality of particulate separators from an intermediate stage of the compressor.

In any of the aspects or embodiments described above and herein, the assembly may further include a turbine including the bladed turbine rotor. The one or more compressed air loads may include a rotor blade stage of the bladed turbine rotor.

In any of the aspects or embodiments described above and herein, the assembly may further include a turbine including the bladed turbine rotor. The one or more compressed air loads may include a vane stage of the turbine.

In any of the aspects or embodiments described above and herein, the assembly may further include a turbine including the bladed turbine rotor. The one or more compressed air loads may include a blade outer air seal (BOAS) of the turbine for the bladed turbine rotor.

In any of the aspects or embodiments described above and herein, the assembly may further include a turbine including the bladed turbine rotor. The engine static structure may further include a mid-turbine frame connected to the turbine. The one or more compressed air loads may include the mid-turbine frame.

In any of the aspects or embodiments described above and herein, the assembly may further include at least one bearing compartment. The one or more compressed air loads may include the at least one bearing compartment.

In any of the aspects or embodiments described above and herein, the plurality of particulate filters may be circumferentially distributed about the engine case assembly.

In any of the aspects or embodiments described above and herein, the plurality of particulate filters may be disposed outside of the gas turbine engine.

According to another aspect of the present disclosure, an assembly for a gas turbine engine of an aircraft propulsion system includes an engine static structure, a compressed air source, one or more compressed air loads, and a particulate separator assembly. The engine static structure includes an engine case assembly. The engine case assembly extends circumferentially about an axis. The engine case assembly surrounds the at least one rotational assembly. The compressed air source is configured to form a compressed air flow. The one or more compressed air loads are disposed within the engine case assembly. The one or more compressed air loads are connected in fluid communication with the compressed air source to receive the compressed air flow. The particulate separator assembly includes a plurality of particulate separators. The plurality of particulate separators are disposed outside of the engine case assembly. The plurality of particulate separators are connected in fluid communication with and between the compressed air source and the one or more compressed air loads. The plurality of particulate separators are configured to separate particulate from the compressed air flow and direct the compressed air flow to the one or more compressed air loads.

According to another aspect of the present disclosure, an assembly for a gas turbine engine of an aircraft propulsion system includes at least one rotational assembly, a compressor, a combustor, a turbine, an engine static structure, and a particulate separator assembly. The at least one rotational assembly is configured for rotation about an axis. The at least one rotational assembly includes a shaft, a bladed compressor rotor, and a bladed turbine rotor. The shaft interconnects the bladed compressor rotor and the bladed turbine rotor. The compressor includes the bladed compressor rotor. The compressor is configured to form a compressed air flow. The turbine includes the bladed turbine rotor. The turbine includes at least one rotor blade stage of the bladed turbine rotor and at least one vane stage. The engine static structure includes an engine case assembly. The engine case assembly extends circumferentially about the axis. The engine case assembly surrounds the at least one rotational assembly. The engine case assembly includes an outer diffuser case and an inner diffuser case. The outer diffuser case and the inner diffuser case form an annular air plenum surrounding the combustor. The annular air plenum includes an outer plenum portion and an inner plenum portion. The outer plenum portion is disposed radially outward of the combustor. The inner plenum portion is disposed radially inward of the combustor. The particulate separator assembly includes a plurality of particulate separators. The plurality of particulate separators are disposed outside of the engine case assembly. The plurality of particulate separators are connected in fluid communication with and between the outer plenum portion and the at least one rotor blade stage and/or the at least one vane stage. The plurality of particulate separators are configured to receive the compressed air flow from the outer plenum portion, separate particulate from the compressed air flow, and direct the compressed air flow to the at least one rotor blade stage and/or the at least one vane stage.

According to another aspect of the present disclosure, an assembly for a gas turbine engine of an aircraft propulsion system includes at least one rotational assembly, a compressor, a turbine, an engine static structure, and a particulate separator assembly. The at least one rotational assembly is configured for rotation about an axis. The at least one rotational assembly includes a shaft, a bladed compressor rotor, and a bladed turbine rotor. The shaft interconnects the bladed compressor rotor and the bladed turbine rotor. The compressor includes the bladed compressor rotor. The compressor is configured to form a compressed air flow. The turbine includes the bladed turbine rotor. The turbine includes at least one rotor blade stage of the bladed turbine rotor and at least one vane stage. The engine static structure includes an engine case assembly. The engine case assembly extends circumferentially about the axis. The engine case assembly surrounds the at least one rotational assembly. The particulate separator assembly includes a plurality of particulate separators. The plurality of particulate separators are disposed outside of the engine case assembly. The plurality of particulate separators are connected in fluid communication with and between an intermediate stage of the compressor and the at least one rotor blade stage and the at least one vane stage. The plurality of particulate separators are configured to receive the compressed air flow from the intermediate stage, separate particulate from the compressed air flow and direct the compressed air flow to the at least one rotor blade stage and the at least one vane stage.

According to another aspect of the present disclosure, an assembly for a gas turbine engine of an aircraft propulsion system includes at least one rotational assembly, a compressor, one or more compressed air loads, and a particulate separator assembly. The at least one rotational assembly is configured for rotation about an axis. The at least one rotational assembly includes a shaft, a bladed compressor rotor, and a bladed turbine rotor. The shaft interconnects the bladed compressor rotor and the bladed turbine rotor. The compressor includes the bladed compressor rotor. The compressor is configured to form a compressed air flow. The one or more compressed air loads are connected in fluid communication with the compressor to receive the compressed air flow. The particulate separator assembly includes a plurality of particulate separators. The plurality of particulate separators are connected in fluid communication with and between the compressor and the one or more compressed air loads. The plurality of particulate separators are configured to separate particulate from the compressed air flow and direct the compressed air flow to the one or more compressed air loads.

The present disclosure, and all its aspects, embodiments and advantages associated therewith will become more readily apparent in view of the detailed description provided below, including the accompanying drawings.

BRIEF DESCRIPTION OF THE DRAWINGS

FIGS. 3A-D illustrate views of exemplary particulate separators for the particulate separator assembly of FIG. 2, in accordance with one or more embodiments of the present disclosure.

DETAILED DESCRIPTION

Figure 1:
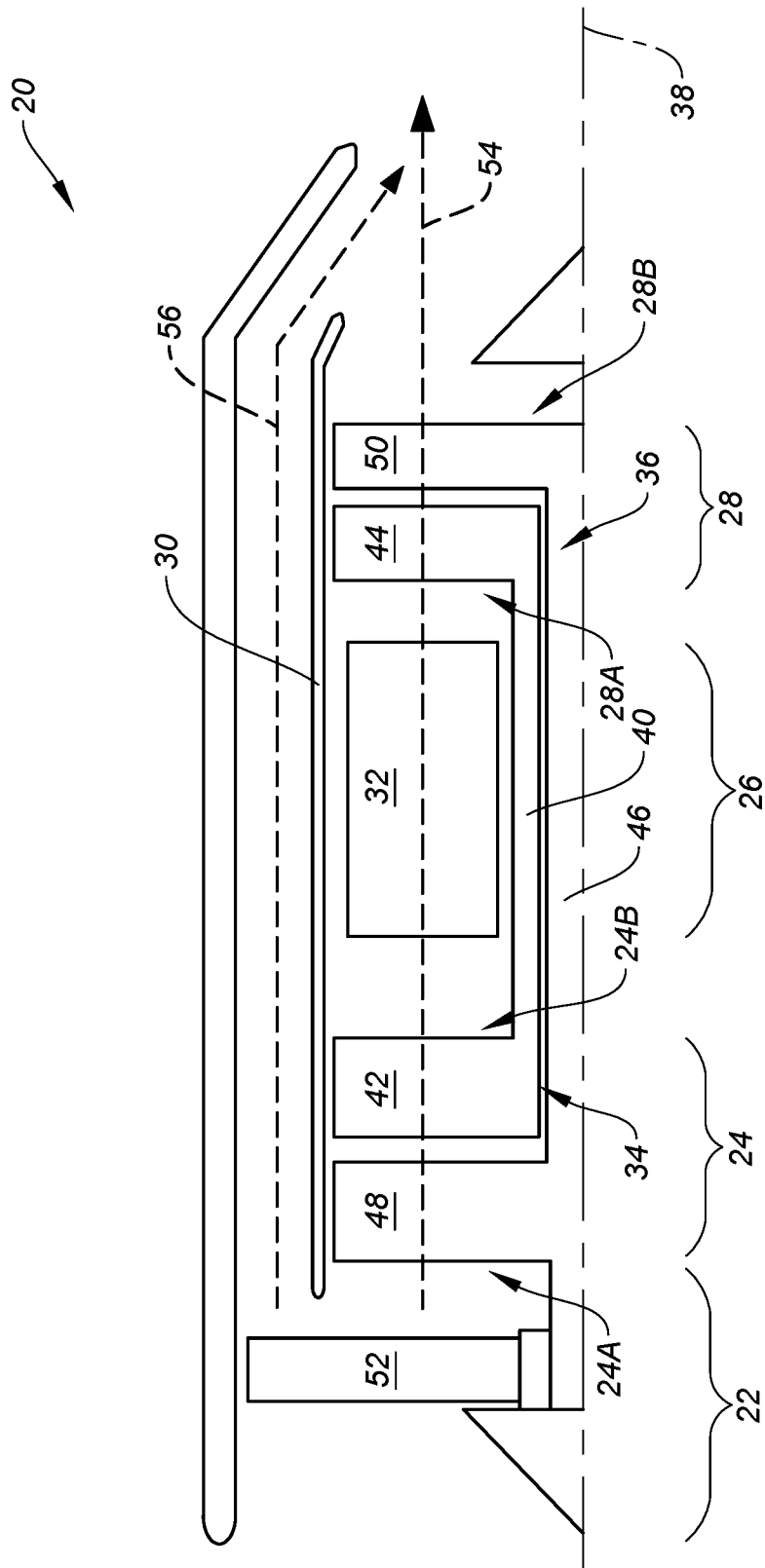
FIG. 1 schematically illustrates a cutaway view of a gas turbine engine for an aircraft propulsion system, in accordance with one or more embodiments of the present disclosure.

FIG. 1 schematically illustrates a gas turbine engine 20. The gas turbine engine 20 of FIG. 1 is a multi-spool turbofan gas turbine engine for an aircraft propulsion system. However, while the following description and accompanying drawings may refer to the turbofan gas turbine engine of FIG. 1 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine.

The gas turbine engine 20 of FIG. 1 includes a fan section 22, a compressor section 24, a combustor section 26, a turbine section 28, and an engine static structure 30. The compressor section 24 of FIG. 1 includes a low-pressure compressor (LPC) 24A and a high-pressure compressor (HPC) 24B. The combustor section 26 includes a combustor 32 (e.g., an annular combustor). The turbine section 28 includes a high-pressure turbine (HPT) 28A and a low-pressure turbine (LPT) 28B.

Components of the fan section 22, the compressor section 24, and the turbine section 28 form a first rotational assembly 34 (e.g., a high-pressure spool) and a second rotational assembly 36 (e.g., a low-pressure spool) of the gas turbine engine 20. The first rotational assembly 34 and the second rotational assembly 36 are mounted for rotation about an axial centerline 38 (e.g., a rotational axis) of the gas turbine engine 20 relative to the engine static structure 30.

The first rotational assembly 34 includes a first shaft 40, a bladed first compressor rotor 42 for the high-pressure compressor 24B, and a bladed first turbine rotor 44 for the high-pressure turbine 28A. The first shaft 40 interconnects the bladed first compressor rotor 42 and the bladed first turbine rotor 44.

The second rotational assembly 36 includes a second shaft 46, a bladed second compressor rotor 48 for the low-pressure compressor 24A, and a bladed second turbine rotor 50 for the low-pressure turbine 28B. The second shaft 46 interconnects the bladed second compressor rotor 48 and the bladed second turbine rotor 50. The second shaft 46 may additionally be directly or indirectly coupled to a bladed fan rotor 52 for the fan section 22. For example, the second shaft 46 may be coupled to the bladed fan rotor 52 (e.g., an input shaft of the bladed fan rotor 52) by a reduction gear assembly configured to drive the bladed fan rotor 52 at a reduced rotational speed relative to the second shaft 46. The first shaft 40 and the second shaft 46 are concentric and configured to rotate about the axial centerline 38. The present disclosure, however, is not limited to concentric configurations of the first shaft 40 and the second shaft 46.

The engine static structure 30 may include one or more engine cases, cowlings, bearing assemblies, and/or other non-rotating structures configured to house and/or support (e.g., rotationally support) components of the gas turbine engine 20 sections 22, 24, 26, 28. The engine static structure 30 may form an exterior (e.g., an outer radial portion) of the gas turbine engine 20.

In operation of the gas turbine engine 20 of FIG. 1, ambient air is directed through the fan section 22 and into a core flow path 54 (e.g., an annular flow path) and a bypass flow path 56 (e.g., an annular flow path) by rotation of the bladed fan rotor 52. Airflow along the core flow path 54 is compressed by the low-pressure compressor 24A and the high-pressure compressor 24B, mixed and burned with fuel in the combustor 32, and then directed through the high-pressure turbine 28A and the low-pressure turbine 28B. The bladed first turbine rotor 44 and the bladed second turbine rotor 50 rotationally drive the first rotational assembly 34 and the second rotational assembly 36, respectively, in response to the combustion gas flow through the high-pressure turbine 28A and the low-pressure turbine 28B. The bypass flow path 56 may be disposed outside the engine static structure 30. For example, the engine static structure 30 and an outer aircraft propulsion system housing (e.g., a nacelle) may form an annular bypass duct radially therebetween, and airflow may be directed through the annular bypass duct along the bypass flow path 56.

The gas turbine engine 20 may operate with high core flow path 54 temperatures to facilitate improved operational efficiency (e.g., fuel efficiency). Accordingly, components of the gas turbine engine 20 which are exposed to the high core flow path 54 temperatures (e.g., components of the high-pressure turbine 28A) may be cooled internally (e.g., by internal cooling passages) and/or externally (e.g., by film cooling holes) facilitate improved component life. In operation of a gas turbine engine, such as the gas turbine engine 20, particulate (e.g., dirt, dust, ice, smoke, smog, ash particles, and other debris) may be ingested into the gas turbine engine and entrained with the air flowing along the core flow path. This particulate may obstruct or otherwise degrade cooling passages, cooling holes, seals, and other gas turbine engine components or features, thereby negatively impacting gas turbine engine operation.

Figure 2:
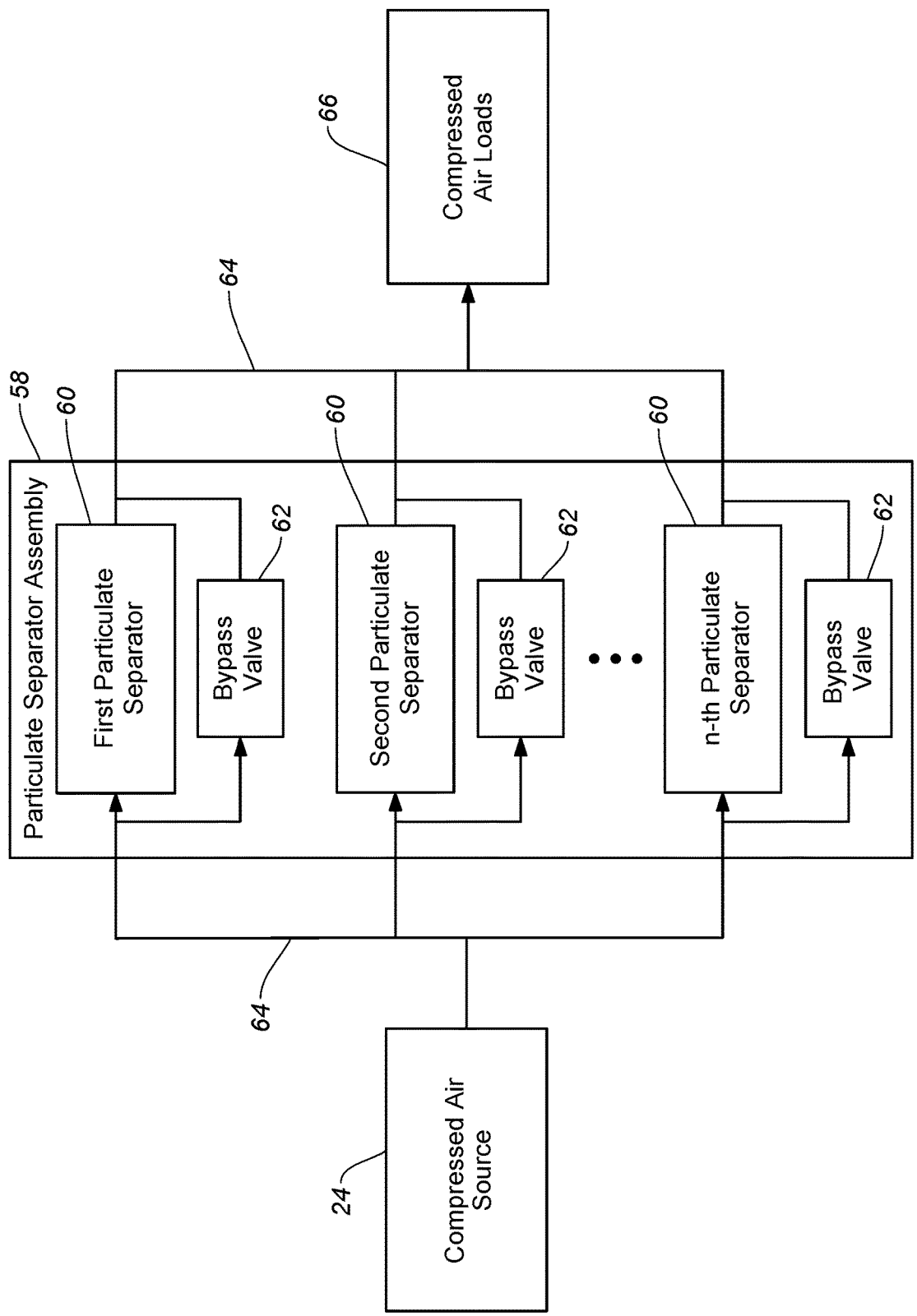
FIG. 2 schematically illustrates a particulate separator assembly, in accordance with one or more embodiments of the present disclosure.

FIG. 2 illustrates a particulate separator assembly 58 for a gas turbine engine such as the gas turbine engine 20 of FIG. 1. The particulate separator assembly 58 of FIG. 2 includes a plurality of particulate separators 60. The particulate separator assembly 58 may additionally include a plurality of bypass valves 62. For example, as shown in FIG. 2, each of the bypass valves 62 may be configured to bypass a respective one of the particulate separators 60. The particulate separators 60 and the bypass valves 62 are connected in fluid communication with a compressed air source. For example, each of the particulate separators 60 and each of the bypass valves 62 of FIG. 2 are connected in fluid communication with the compressor section 24 (e.g., the low-pressure compressor 24A or the high-pressure compressor 24B) such that the compressor section 24 directs compressed (e.g., pressurized) air flow 64 to each of the particulate separators 60 and each of the bypass valves 62. The particulate separator assembly 58, however, is not limited to the compressor section 24 for the compressed air source, and the compressed air source may alternatively include an air compressor independent of the compressor section 24. The compressed air flow 64 is directed through the particulate separator assembly 58 (e.g., the particulate separators 60 or the bypass valves 62) to one or more compressed air loads 66, as will be discussed in further detail below. The compressed air loads 66 may include, but are not limited to, rotor blades, vanes, blade outer air seals (BOAS), portions of the engine static structure 30, bearing compartments, and the like which are cooled or otherwise exposed to the compressed air flow 64. The particulate separator assembly 58 (e.g., the particulate separators 60) may be disposed outside of an engine case for the gas turbine engine 20. The particulate separator assembly 58 (e.g., the particulate separators 60) may additionally be disposed outside of the gas turbine engine 20. The aforementioned exemplary locations of the particulate separator assembly 58 facilitate reduced environmental temperature exposure for the particulate separator assembly 58 relative to locations within the gas turbine engine 20. The aforementioned exemplary locations of the particulate separator assembly 58 may additionally facilitate easier removal or cleaning of particulate separator assembly 58 components such as, but not limited to, the particulate separators 60 during gas turbine engine 20 maintenance.

FIGS. 3A-D illustrate exemplary configurations of the particulate separators 60. The particulate separators 60 are configured to separate all or a substantial amount of particulate (e.g., dirt, dust, ice, smoke, smog, ash particles, and other debris) from the compressed air flow 64 as the compressed air flow 64 is directed through the particulate separators 60. It should be understood that the present disclosure is not limited to the exemplary configurations of the particulate separators 60 of FIGS. 3A-D.

The particulate separator 60 of FIG. 3A is configured as a particulate air filter 60A. The particulate air filter 60A is formed by or otherwise includes a fibrous or porous material configured to remove particulate from the compressed air flow 64 as the compressed air flow 64 is directed through the particulate air filter 60A. For example, the particulate air filter 60A may be formed by or otherwise include a fibrous or porous material such as, but not limited to, paper, foam, metallic mesh (e.g., stainless steel mesh), or the like.

FIG. 3B illustrates a cutaway view of a particulate separator 60B including a housing 68 surrounding and forming a settling chamber 70. The housing includes an inlet 72 and an outlet 74. The compressed air flow 64 is directed through the particulate separator 60B from the inlet 72, through the settling chamber 70, and to the outlet 74 where the compressed air flow 64 is directed to the compressed air loads 66 (see FIG. 2). The settling chamber 70 may be formed with a large volume, for example, relative to a cross-sectional area of the outlet 74. Accordingly, the compressed air flow 64 through the settling chamber 70 may diffuse, thereby reducing the velocity of the compressed air flow 64. Particulate (illustrated schematically in FIG. 3B as particulate 76) entrained with the compressed air flow 64 may separate from the compressed air and fall to the bottom of the settling chamber 70. The particulate separator 60B may be particularly useful for systems (e.g., compressor systems) which experience relatively low gas flow rates, thereby facilitating separation of particulate from the gas by settling. However, the present disclosure is not limited to any particular compressed air flow 64 rate through the particulate separator 60. Alternative configurations of the particulate separator 60B may include static trap particulate separators, dump particulate separators, stagnation point accumulators, and the like.

FIG. 3C illustrates a cutaway view of a particulate separator 60C configured as an inertial particulate separator. The particulate separator 60C includes a housing 78 surrounding and forming a serpentine passage 80. The housing includes an inlet 82 and an outlet 84. The compressed air flow 64 is directed through the particulate separator 60C from the inlet 82, through the serpentine passage 80, and to the outlet 84 where the compressed air flow 64 is directed to the compressed air loads 66 (see FIG. 2). Particulate (schematically illustrated in FIG. 3C as particulate 86) entrained with the compressed air flow 64 may become separated from the compressed air flow 64 in one or more turns of the serpentine passage 80. The separated particulate 86 may settle in one or more low-flow portions of the serpentine passage 80.

FIG. 3D illustrates a cutaway view of another particulate separator 60D configured as an inertial particulate separator. The particulate separator 60D includes a curved conduit 88 forming a passage for the compressed air flow 64. The curved conduit 88 forms an inlet 90, an inner diameter outlet 92, and an outer diameter outlet 94. The curved conduit 88 is split downstream of the inlet 90 to independently define the inner diameter outlet 92 and the outer diameter outlet 94. The curved conduit 88 includes at least one turn located in an intermediate portion of the curved conduit 88 between the inlet 90 and the outlets 92, 94. The at least one turn may include a single turn. The single turn may extend, for example, approximately 240 to 300 degrees about a center axis of the at least one turn. Alternatively, the at least one turn may include a plurality of turns (e.g., a plurality of turns defining a helical flow path). The passage formed by the curved conduit 88 may have a first radius of curvature at the inner diameter outlet 92 which is greater than a second radius of curvature of the passage at the outer diameter outlet 94. Particulate entrained with the compressed air flow 64 may be centrifugally displaced towards a radially outer portion of the curved conduit 88 and may then be directed into and through the outer diameter outlet 94 to a collection chamber or other particulate disposal component. The compressed air flow 64 through the inner diameter outlet 92 may be free of or substantially free of particulate and may be directed to the one or more compressed air loads 66.

Referring again to FIG. 2, each of the bypass valves 62 is connected in fluid communication with the compressor section 24 and the one or more compressed air loads 66 to selectively direct at least some of the compressed air flow 64 from the compressor section 24 to the one or more compressed air loads 66 without passing through a respective one of the particulate separators 60 (e.g., the bypass valves 62 selectively bypass the particulate separators 60 with respect to the compressed air flow 64). Each of the bypass valves 62 is positionable in a closed position (e.g., a fully closed position), an open position (e.g., a fully open position), or a plurality of intermediate positions between the closed position and the open position. The bypass valves 62 may be positioned in the open position or the intermediate positions to direct at least some of the compressed air flow 64 from the compressor section 24 to the one or more compressed air loads 66 bypassing the particulate separators 60. The bypass valves 62 may be positioned in the open position or the intermediate positions to facilitate increased compressed air flow 64 to the compressed air loads 66, for example, in response to increased compressed air flow 64 differential pressure across the particulate separators 60 (e.g., due to a clogged or otherwise fully or partially obstructed particulate air filter or other particulate separator). The bypass valves 62 may be configured, for example, as solenoid valves or other remotely-controlled valves. The present disclosure, however, is not limited to any particular configuration for the bypass valves 62.

Figure 4:
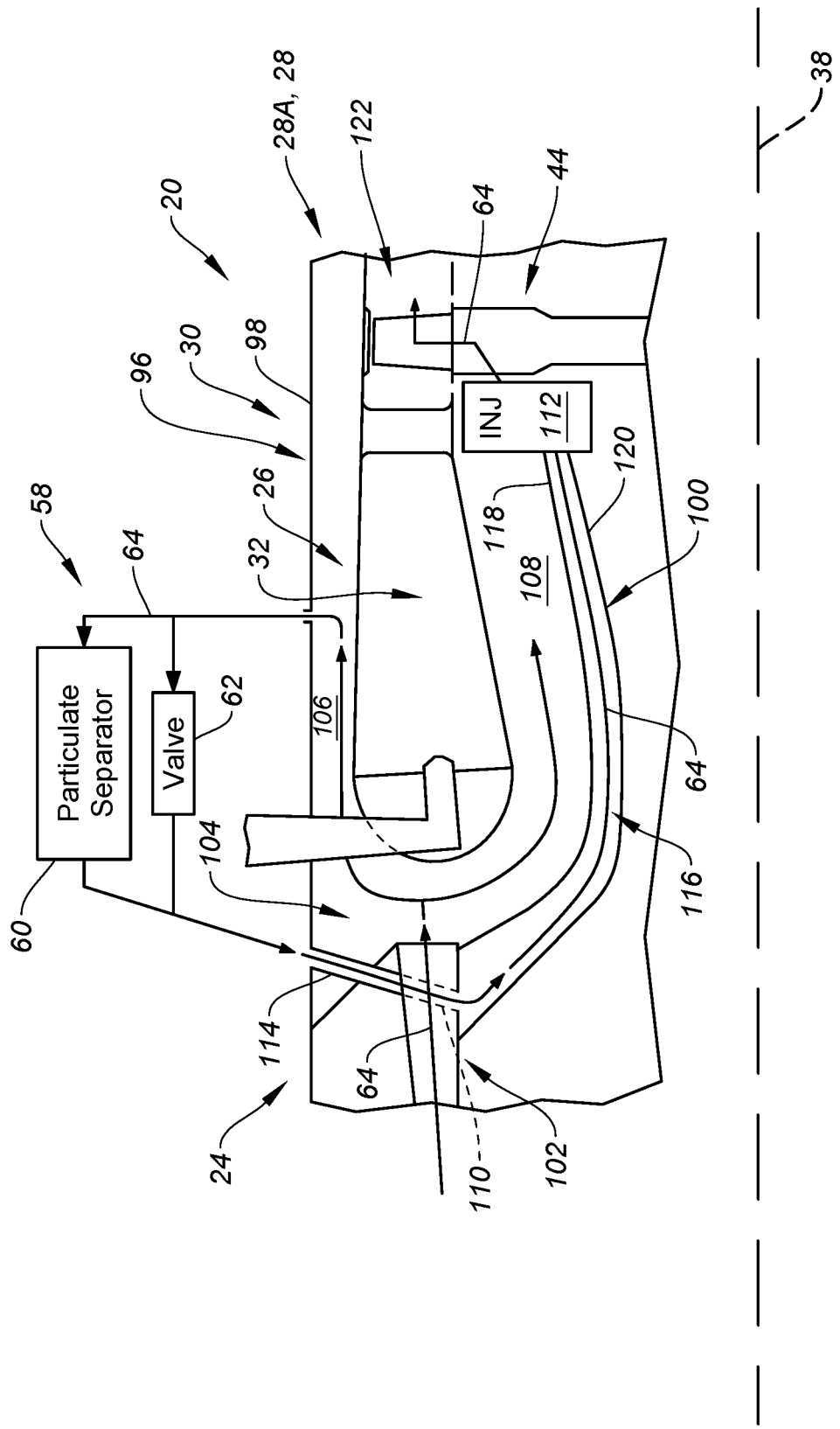
FIG. 4 schematically illustrates a cutaway view of the gas turbine engine of FIG. 1 including an exemplary configuration of the particulate separator assembly of FIG. 2, in accordance with one or more embodiments of the present disclosure.

FIG. 4 illustrates an exemplary configuration of the particulate separator assembly 58 for the gas turbine engine 20. FIG. 4 illustrates a cutaway view of portions of the compressor section 24, the combustor section 26, and the turbine section 28. The engine static structure 30 of FIG. 4 includes an engine case assembly 96. The engine case assembly 96 of FIG. 4 includes an outer diffuser case 98 and an inner diffuser case 100 disposed radially inward of the outer diffuser case 98. Each of the outer diffuser case 98 and the inner diffuser case 100 extends circumferentially about (e.g., completely around) the axial centerline 38. The outer diffuser case 98 and the inner diffuser case 100 form an annular diffuser nozzle 102. The outer diffuser case 98 and the inner diffuser case 100 form an annular air plenum 104 surrounding the combustor 32. The air plenum 104 includes an outer plenum portion 106 disposed between (e.g., radially between) the combustor 32 and the outer diffuser case 98. The air plenum 104 includes an inner plenum portion 108 disposed between (e.g., radially between) the combustor 32 and the inner diffuser case 100. The diffuser nozzle 102 directs the compressed air flow 64 into the air plenum 104 (e.g., the outer plenum portion 106 and the inner plenum portion 108) for introduction into the combustor 32.

The particulate separator assembly 58 of FIG. 4 includes the particulate separators 60 and the bypass valves 62 disposed outside (e.g., radially outside) the engine case assembly 96 (e.g., the outer diffuser case 98). For example, the particulate separators 60 and the bypass valves 62 may be disposed outside of the gas turbine engine 20 (e.g., outside the engine static structure 30). The particulate separators 60 and the bypass valves 62 may be circumferentially distributed about the engine case assembly 96 (e.g., relative to the axial centerline 38). The particulate separator assembly 58 of FIG. 4 further includes a plurality of hollow struts 110 of the diffuser nozzle 102 and an injector 112 (e.g., a tangential on-board injector (TOBI)). The plurality of hollow struts 110 extend through (e.g., radially through) the diffuser nozzle 102. The plurality of hollow struts 110 are circumferentially distributed within the diffuser nozzle 102 about the axial centerline 38. The particulate separator assembly 58 may further include a plurality of extension tubes 114 with each extension tube 114 extending between and to the outer diffuser case 98 and the diffuser nozzle 102 at (e.g., on, adjacent, or proximate) a respective one of the plurality of hollow struts 110. Each of the extension tubes 114 may be connected in fluid communication with a respective one of the plurality of hollow struts 110. The injector 112 is connected in fluid communication with the plurality of hollow struts 110 by an annular cavity 116 formed by the inner diffuser case 100. For example, the inner diffuser case 100 may form or otherwise include an outer case portion 118 and an inner case portion 120. The annular cavity 116 may be formed between (e.g., radially between) the outer case portion 118 and the inner case portion 120. The annular cavity 116 may extend between and to the diffuser nozzle 102 (e.g., the plurality of hollow struts 110) and the injector 112. The annular cavity 116 may be separated from the inner plenum portion 108 by the outer case portion 118. The injector 112 is disposed at (e.g., on, adjacent, or proximate) an upstream (e.g., axially forward) end of the turbine section 28. For example, the injector 112 of FIG. 4 is disposed at (e.g., on, adjacent, or proximate) a first rotor blade stage 122 of the high-pressure turbine 28A (e.g., the first bladed turbine rotor 44).

In operation, the compressed air flow 64 is directed from the compressor section 24 to the air plenum 104 (e.g., the outer plenum portion 106 and the inner plenum portion 108) by the diffuser nozzle 102. The compressed air flow 64 from the outer plenum portion 106 is directed to the particulate separators 60 where particulate is separated from the compressed air flow 64 by the particulate separators 60. The compressed air flow 64 is directed to the injector 112 through the extension tubes 114, the hollow struts 110, and the annular cavity 116. The injector 112 directs the compressed air flow 64 to and into the first rotor blade stage 122. The compressed air flow 64 may flow through the first rotor blade stage 122. For example, the compressed air flow 64 may flow through internal passages of a disk and rotor blades for the first rotor blade stage 122 and may be directed out of the rotor blades through cooling holes formed through the rotor blades, thereby providing cooling for the first rotor blade stage 122. Components of the particulate separator assembly 58, such as the particulate separators 60 and the bypass valves 62, may be connected in fluid communication by any suitable conduit (e.g., pipe, hose, tube, passage, etc.), manifold, or other fluid conveying component to direct the compressed air flow 64 through the particulate separator assembly 58, as described above.

Figure 5:
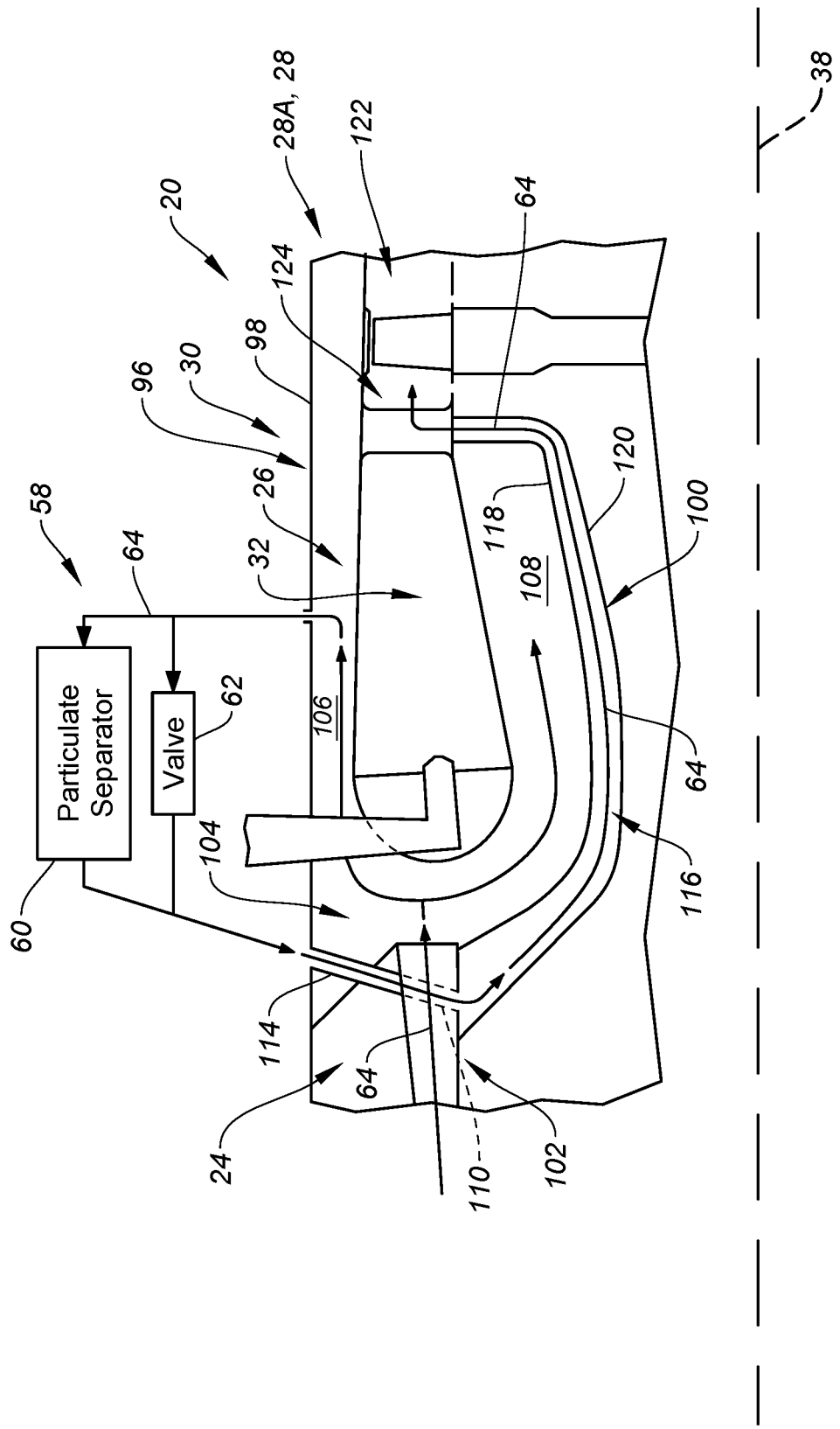
FIG. 5 schematically illustrates a cutaway view of the gas turbine engine of FIG. 1 including another exemplary configuration of the particulate separator assembly of FIG. 2, in accordance with one or more embodiments of the present disclosure.

FIG. 5 illustrates another exemplary configuration of the particulate separator assembly 58 for the gas turbine engine 20. FIG. 5 illustrates a cutaway view of portions of the compressor section 24, the combustor section 26, and the turbine section 28. The engine static structure 30 of FIG. 5 includes the engine case assembly 96. The engine case assembly 96 of FIG. 5 includes the outer diffuser case 98 and the inner diffuser case 100 disposed radially inward of the outer diffuser case 98. Each of the outer diffuser case 98 and the inner diffuser case 100 extends circumferentially about (e.g., completely around) the axial centerline 38. The outer diffuser case 98 and the inner diffuser case 100 form the annular diffuser nozzle 102. The outer diffuser case 98 and the inner diffuser case 100 form the annular air plenum 104 surrounding the combustor 32. The air plenum 104 includes the outer plenum portion 106 disposed between (e.g., radially between) the combustor 32 and the outer diffuser case 98. The air plenum 104 includes the inner plenum portion 108 disposed between (e.g., radially between) the combustor 32 and the inner diffuser case 100. The diffuser nozzle 102 directs the compressed air flow 64 into the air plenum 104 (e.g., the outer plenum portion 106 and the inner plenum portion 108) for introduction into the combustor 32.

The particulate separator assembly 58 of FIG. 5 includes the particulate separators 60 and the bypass valves 62 disposed outside (e.g., radially outside) the engine case assembly 96 (e.g., the outer diffuser case 98). For example, the particulate separators 60 and the bypass valves 62 may be disposed outside of the gas turbine engine 20 (e.g., outside the engine static structure 30). The particulate separators 60 and the bypass valves 62 may be circumferentially distributed about the engine case assembly 96 (e.g., relative to the axial centerline 38). The particulate separator assembly 58 of FIG. 5 further includes the plurality of hollow struts 110 of the diffuser nozzle 102. The plurality of hollow struts 110 extend through (e.g., radially through) the diffuser nozzle 102. The plurality of hollow struts 110 are circumferentially distributed within the diffuser nozzle 102 about the axial centerline 38. The particulate separator assembly 58 may further include the plurality of extension tubes 114 with each extension tube 114 extending between and to the outer diffuser case 98 and the diffuser nozzle 102 at (e.g., on, adjacent, or proximate) a respective one of the plurality of hollow struts 110. Each of the extension tubes 114 may be connected in fluid communication with a respective one of the plurality of hollow struts 110. The plurality of hollow struts 110 are connected in fluid communication with a first vane stage 124 of the turbine section 28 (e.g., the high-pressure turbine 28A) by the annular cavity 116 formed by the inner diffuser case 100. For example, the inner diffuser case 100 may form or otherwise include the outer case portion 118 and the inner case portion 120. The annular cavity 116 may be formed between (e.g., radially between) the outer case portion 118 and the inner case portion 120. The annular cavity 116 may extend between and to the diffuser nozzle 102 (e.g., the plurality of hollow struts 110) and the first vane stage 124. The annular cavity 116 may be separated from the inner plenum portion 108 by the outer case portion 118. The first vane stage 124 is positioned between the combustor 32 and the first rotor blade stage 122 with respect to the core flow path 54 (see FIG. 1).

In operation, the compressed air flow 64 is directed from the compressor section 24 to the air plenum 104 (e.g., the outer plenum portion 106 and the inner plenum portion 108) by the diffuser nozzle 102. The compressed air flow 64 from the outer plenum portion 106 is directed to the particulate separators 60 where particulate is separated from the compressed air flow 64 by the particulate separators 60. The compressed air flow 64 is directed to the first vane stage 124 through the extension tubes 114, the hollow struts 110, and the annular cavity 116. The compressed air flow 64 may flow through the first vane stage 124. For example, the compressed air flow 64 may flow through internal passages of fixed vanes of the first vane stage 124 and may be directed out of the vanes through cooling holes formed through the vanes, thereby providing cooling for the first vane stage 124. Components of the particulate separator assembly 58, such as the particulate separators 60 and the bypass valves 62, may be connected in fluid communication by any suitable conduit (e.g., pipe, hose, tube, passage, etc.), manifold, or other fluid conveying component to direct the compressed air flow 64 through the particulate separator assembly 58, as described above.

Figure 6:
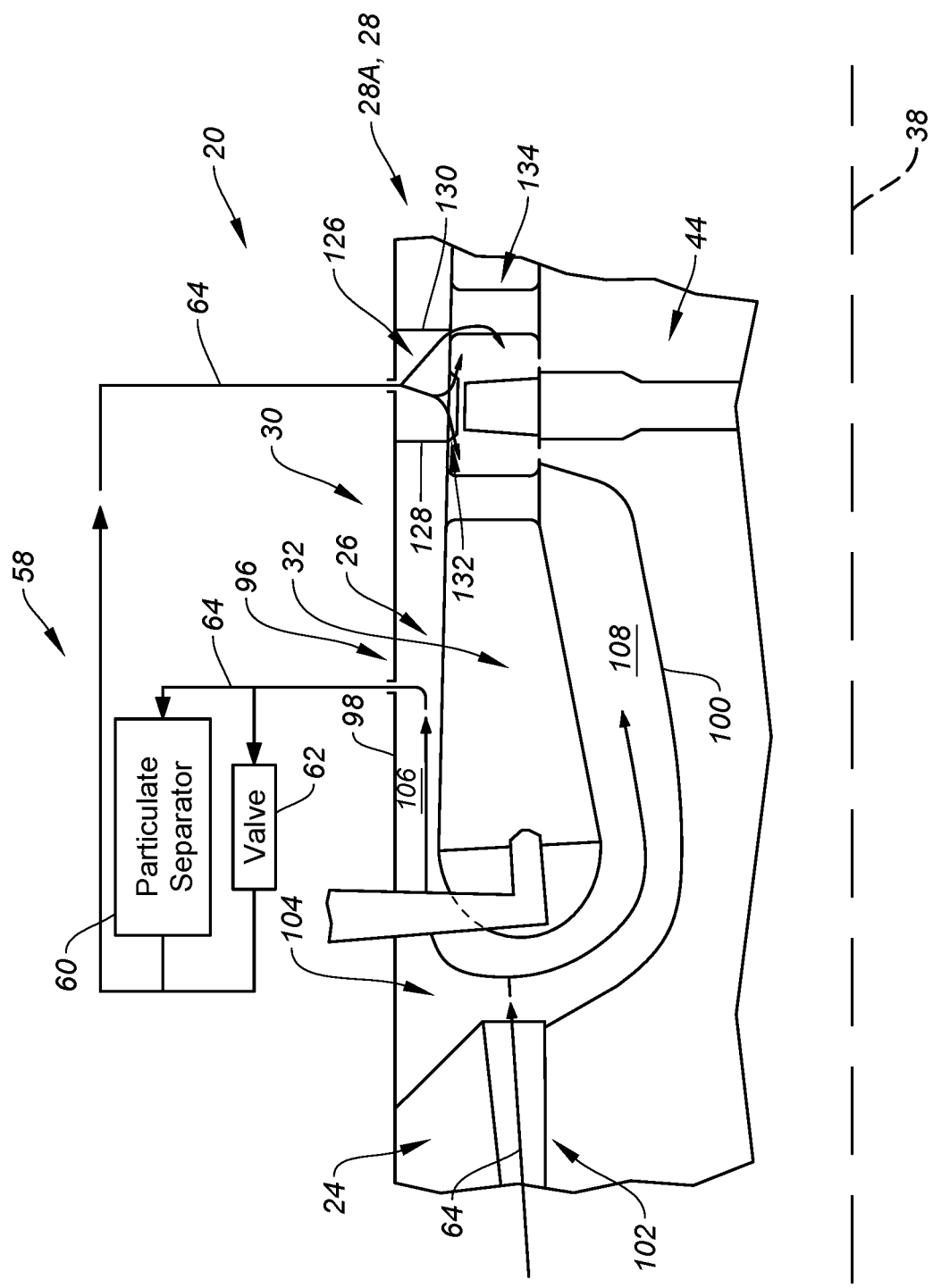
FIG. 6 schematically illustrates a cutaway view of the gas turbine engine of FIG. 1 including another exemplary configuration of the particulate separator assembly of FIG. 2, in accordance with one or more embodiments of the present disclosure.

FIG. 6 illustrates another exemplary configuration of the particulate separator assembly 58 for the gas turbine engine 20. FIG. 6 illustrates a cutaway view of portions of the compressor section 24, the combustor section 26, and the turbine section 28. The engine static structure 30 of FIG. 6 includes the engine case assembly 96. The engine case assembly 96 of FIG. 6 includes the outer diffuser case 98 and the inner diffuser case 100 disposed radially inward of the outer diffuser case 98. Each of the outer diffuser case 98 and the inner diffuser case 100 extends circumferentially about (e.g., completely around) the axial centerline 38. The outer diffuser case 98 and the inner diffuser case 100 form the annular diffuser nozzle 102. The outer diffuser case 98 and the inner diffuser case 100 form the annular air plenum 104 surrounding the combustor 32. The air plenum 104 includes the outer plenum portion 106 disposed between (e.g., radially between) the combustor 32 and the outer diffuser case 98. The air plenum 104 includes the inner plenum portion 108 disposed between (e.g., radially between) the combustor 32 and the inner diffuser case 100. The diffuser nozzle 102 directs the compressed air flow 64 into the air plenum 104 (e.g., the outer plenum portion 106 and the inner plenum portion 108) for introduction into the combustor 32.

The particulate separator assembly 58 of FIG. 6 includes the particulate separators 60 and the bypass valves 62 disposed outside (e.g., radially outside) the engine case assembly 96 (e.g., the outer diffuser case 98). For example, the particulate separators 60 and the bypass valves 62 may be disposed outside of the gas turbine engine 20 (e.g., outside the engine static structure 30). The particulate separators 60 and the bypass valves 62 may be circumferentially distributed about the engine case assembly 96 (e.g., relative to the axial centerline 38). The particulate separators 60 and the bypass valves 62 are connected in fluid communication with an annular cavity 126 of the turbine section 28. The annular cavity 126 may extend circumferentially about (e.g., completely around) the axial centerline 38. The annular cavity 126 may be disposed between and formed by the engine case assembly 96 and the high-pressure turbine 28A. For example, the annular cavity 126 may be positioned between (e.g., radially between) the engine case assembly 96 and the high-pressure turbine 28A. The annular cavity 126 may be further formed by a forward wall 128 and an aft wall 130 of the engine case assembly 96. Each of the forward wall 128 and the aft wall 130 may extend circumferentially about (e.g., completely around) the axial centerline 38 between (e.g., radially between) the engine case assembly 96 and the high-pressure turbine 28A. The forward wall 128 may, for example, separate the annular cavity 126 from the annular air plenum 104 (e.g., the outer plenum portion 106).

In operation, the compressed air flow 64 is directed from the compressor section 24 to the air plenum 104 (e.g., the outer plenum portion 106 and the inner plenum portion 108) by the diffuser nozzle 102. The compressed air flow 64 from the outer plenum portion 106 is directed to the particulate separators 60 where particulate is separated from the compressed air flow 64 by the particulate separators 60. The compressed air flow 64 is directed from the particulate separators 60 and/or the bypass valves 62 to the annular cavity 126. The compressed air flow 64 may be directed from the annular cavity 126 into a blade outer air seal (BOAS) 132 for the first rotor blade stage 122 and/or a second vane stage 134 of the turbine section 28 (e.g., the high-pressure turbine 28A) at a plurality of circumferential positions. The BOAS 132 of FIG. 6 is disposed radially outward of the first rotor blade stage 122. The compressed air flow 64 may be directed through internal segments of the BOAS 132 to provide cooling for the BOAS 132. The second vane stage 134 is positioned immediately downstream of the first rotor blade stage 122 with respect to the core flow path 54 (see FIG. 1). The compressed air flow 64 may flow through the second vane stage 134. For example, the compressed air flow 64 may flow through internal passages of fixed vanes of the second vane stage 134 and may be directed out of the vanes through cooling holes formed through the vanes, thereby providing cooling for the second vane stage 134. Components of the particulate separator assembly 58, such as the particulate separators 60 and the bypass valves 62, may be connected in fluid communication by any suitable conduit (e.g., pipe, hose, tube, passage, etc.), manifold, or other fluid conveying component to direct the compressed air flow 64 through the particulate separator assembly 58, as described above.

Figure 7:
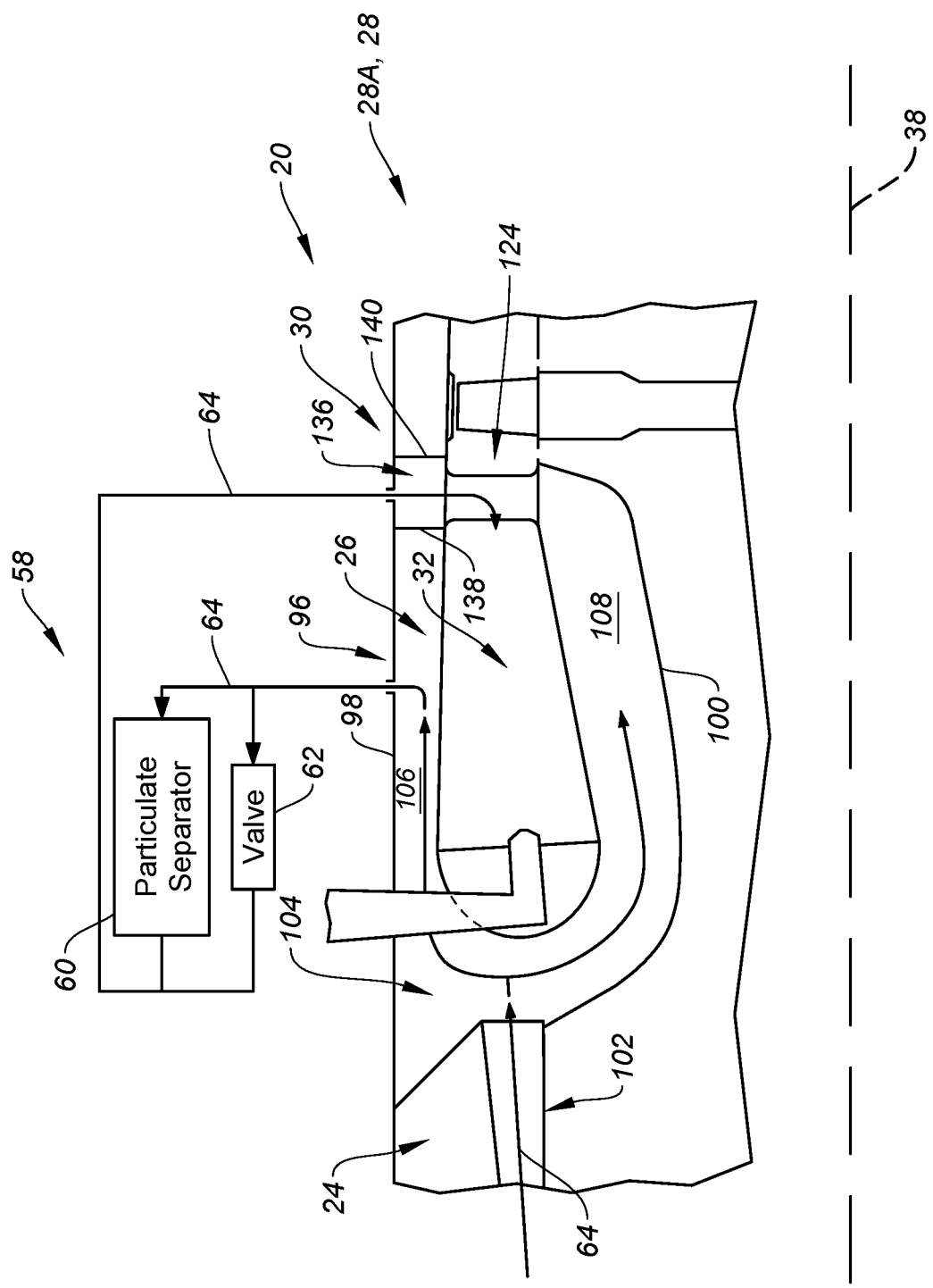
FIG. 7 schematically illustrates a cutaway view of the gas turbine engine of FIG. 1 including another exemplary configuration of the particulate separator assembly of FIG. 2, in accordance with one or more embodiments of the present disclosure.

FIG. 7 illustrates another exemplary configuration of the particulate separator assembly 58 for the gas turbine engine 20. FIG. 7 illustrates a cutaway view of portions of the compressor section 24, the combustor section 26, and the turbine section 28. The engine static structure 30 of FIG. 7 includes the engine case assembly 96. The engine case assembly 96 of FIG. 6 includes the outer diffuser case 98 and the inner diffuser case 100 disposed radially inward of the outer diffuser case 98. Each of the outer diffuser case 98 and the inner diffuser case 100 extends circumferentially about (e.g., completely around) the axial centerline 38. The outer diffuser case 98 and the inner diffuser case 100 form the annular diffuser nozzle 102. The outer diffuser case 98 and the inner diffuser case 100 form the annular air plenum 104 surrounding the combustor 32. The air plenum 104 includes the outer plenum portion 106 disposed between (e.g., radially between) the combustor 32 and the outer diffuser case 98. The air plenum 104 includes the inner plenum portion 108 disposed between (e.g., radially between) the combustor 32 and the inner diffuser case 100. The diffuser nozzle 102 directs the compressed air flow 64 into the air plenum 104 (e.g., the outer plenum portion 106 and the inner plenum portion 108) for introduction into the combustor 32.

The particulate separator assembly 58 of FIG. 7 includes the particulate separators 60 and the bypass valves 62 disposed outside (e.g., radially outside) the engine case assembly 96 (e.g., the outer diffuser case 98). For example, the particulate separators 60 and the bypass valves 62 may be disposed outside of the gas turbine engine 20 (e.g., outside the engine static structure 30). The particulate separators 60 and the bypass valves 62 may be circumferentially distributed about the engine case assembly 96 (e.g., relative to the axial centerline 38). The particulate separators 60 and the bypass valves 62 are connected in fluid communication with an annular cavity 136 of the turbine section 28. The annular cavity 136 may extend circumferentially about (e.g., completely around) the axial centerline 38. The annular cavity 136 may be disposed between and formed by the engine case assembly 96 and the high-pressure turbine 28A. For example, the annular cavity 136 may be positioned between (e.g., radially between) the engine case assembly 96 and the high-pressure turbine 28A. The annular cavity 136 may be further formed by a forward wall 138 and an aft wall 140 of the engine case assembly 96. Each of the forward wall 138 and the aft wall 140 may extend circumferentially about (e.g., completely around) the axial centerline 38 between (e.g., radially between) the engine case assembly 96 and the high-pressure turbine 28A. The forward wall 138 may, for example, separate the annular cavity 136 from the annular air plenum 104 (e.g., the outer plenum portion 106).

In operation, the compressed air flow 64 is directed from the compressor section 24 to the air plenum 104 (e.g., the outer plenum portion 106 and the inner plenum portion 108) by the diffuser nozzle 102. The compressed air flow 64 from the outer plenum portion 106 is directed to the particulate separators 60 where particulate is separated from the compressed air flow 64 by the particulate separators 60. The compressed air flow 64 is directed from the particulate separators 60 and/or the bypass valves 62 to the annular cavity 136. The compressed air flow 64 may be directed from the annular cavity 136 into the first vane stage 124 at a plurality of circumferential positions. The compressed air flow 64 may flow through the first vane stage 124. For example, the compressed air flow 64 may flow through internal passages of fixed vanes of the first vane stage 124 and may be directed out of the vanes through cooling holes formed through the vanes, thereby providing cooling for the first vane stage 124. Components of the particulate separator assembly 58, such as the particulate separators 60 and the bypass valves 62, may be connected in fluid communication by any suitable conduit (e.g., pipe, hose, tube, passage, etc.), manifold, or other fluid conveying component to direct the compressed air flow 64 through the particulate separator assembly 58, as described above.

Figure 8:
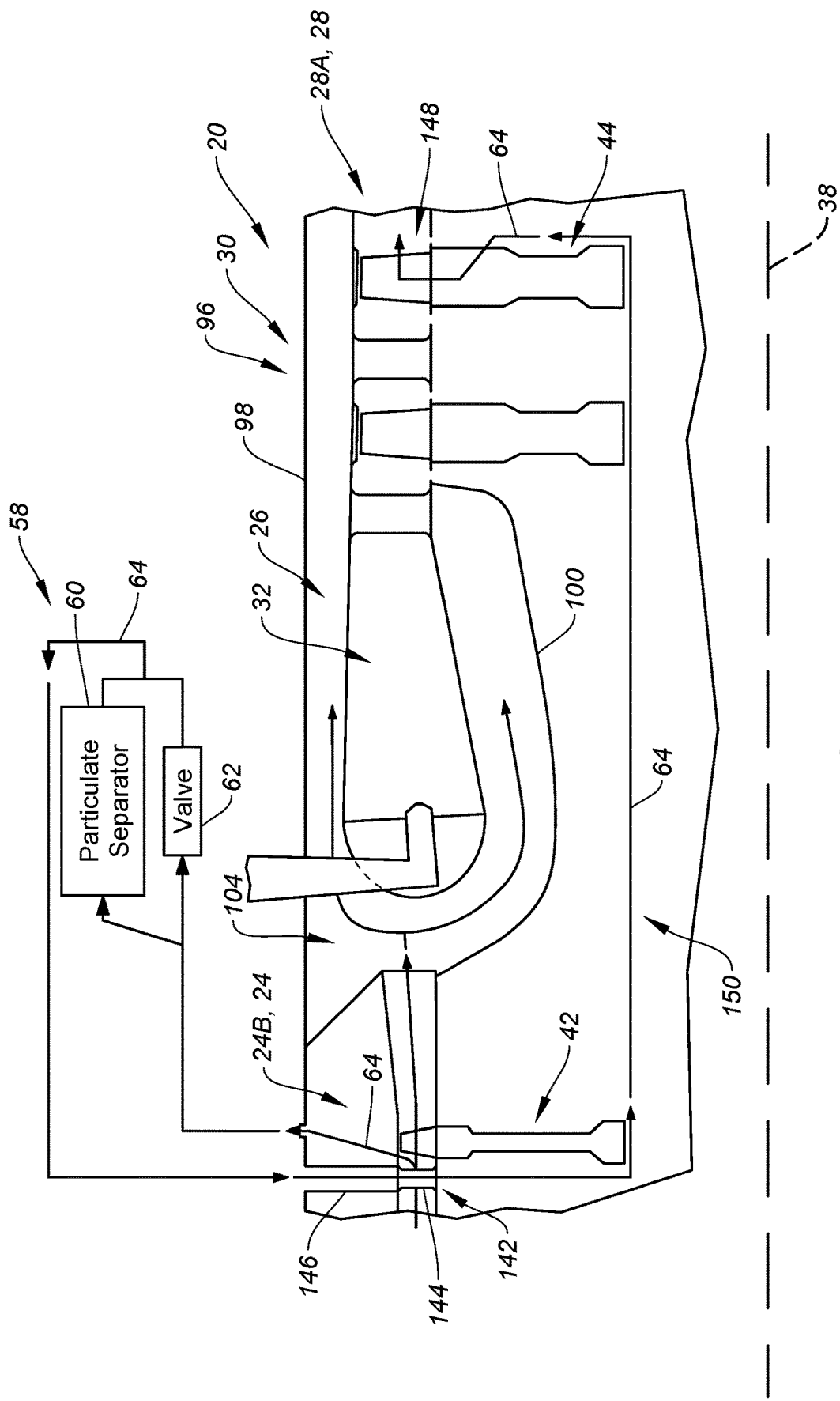
FIG. 8 schematically illustrates a cutaway view of the gas turbine engine of FIG. 1 including another exemplary configuration of the particulate separator assembly of FIG. 2, in accordance with one or more embodiments of the present disclosure.

FIG. 8 illustrates another exemplary configuration of the particulate separator assembly 58 for the gas turbine engine 20. FIG. 8 illustrates a cutaway view of portions of the compressor section 24 (e.g., the high-pressure compressor 24B), the combustor section 26, and the turbine section 28. The engine static structure 30 of FIG. 8 includes the engine case assembly 96. The engine case assembly 96 of FIG. 8 includes the outer diffuser case 98 and the inner diffuser case 100 disposed radially inward of the outer diffuser case 98. Each of the outer diffuser case 98 and the inner diffuser case 100 extends circumferentially about (e.g., completely around) the axial centerline 38. The outer diffuser case 98 and the inner diffuser case 100 form the annular diffuser nozzle 102. The outer diffuser case 98 and the inner diffuser case 100 form the annular air plenum 104 surrounding the combustor 32. The diffuser nozzle 102 directs the compressed air flow 64 into the air plenum 104 (e.g., the outer plenum portion 106 and the inner plenum portion 108) for introduction into the combustor 32.

The particulate separator assembly 58 of FIG. 8 includes the particulate separators 60 and the bypass valves 62 disposed outside (e.g., radially outside) the engine case assembly 96 (e.g., the outer diffuser case 98). For example, the particulate separators 60 and the bypass valves 62 may be disposed outside of the gas turbine engine 20 (e.g., outside the engine static structure 30). The particulate separators 60 and the bypass valves 62 may be circumferentially distributed about the engine case assembly 96 (e.g., relative to the axial centerline 38). The particulate separator assembly 58 of FIG. 8 further includes a vane stage 142 of the high-pressure compressor 24B. The vane stage 142 includes a plurality of hollow vanes 144 circumferentially distributed within the high-pressure compressor 24B about the axial centerline 38. The particulate separator assembly 58 may further include the plurality of extension tubes 146 with each extension tube 146 extending between and to the engine case assembly 96 and the high-pressure compressor 24B at (e.g., on, adjacent, or proximate) a respective one of the plurality of hollow vanes 144. Each of the extension tubes 146 may be connected in fluid communication with a respective one of the plurality of hollow vanes 144. The plurality of hollow vanes 144 are connected in fluid communication with a second rotor blade stage 148 of the high-pressure turbine 28A (e.g., the first bladed turbine rotor 44).

In operation, the compressed air flow 64 (e.g., compressor bleed air) is directed from an intermediate stage of the high-pressure compressor 24B to the particulate separators 60 where particulate is separated from the compressed air flow 64 by the particulate separators 60. The compressed air flow 64 is directed to the second rotor blade stage 148 through the extension tubes 146, the hollow vanes 144, and an annular cavity 150 forward radially inward of the inner diffuser case 100. For example, the annular cavity 150 may be formed between the inner diffuser case 100 and the first shaft 40 (see FIG. 1). The compressed air flow 64 may be directed through passages (not shown) of the first shaft 40, the bladed first compressor rotor 42, and the bladed first turbine rotor 44. The compressed air flow 64 is directed through the second rotor blade stage 148. For example, the compressed air flow 64 may flow through internal passages of a disk and rotor blades for the second rotor blade stage 148 and may be directed out of the rotor blades through cooling holes formed through the rotor blades, thereby providing cooling for the second rotor blade stage 148. Components of the particulate separator assembly 58, such as the particulate separators 60 and the bypass valves 62, may be connected in fluid communication by any suitable conduit (e.g., pipe, hose, tube, passage etc.), manifold, or other fluid conveying component to direct the compressed air flow 64 through the particulate separator assembly 58, as described above.

Figure 9:
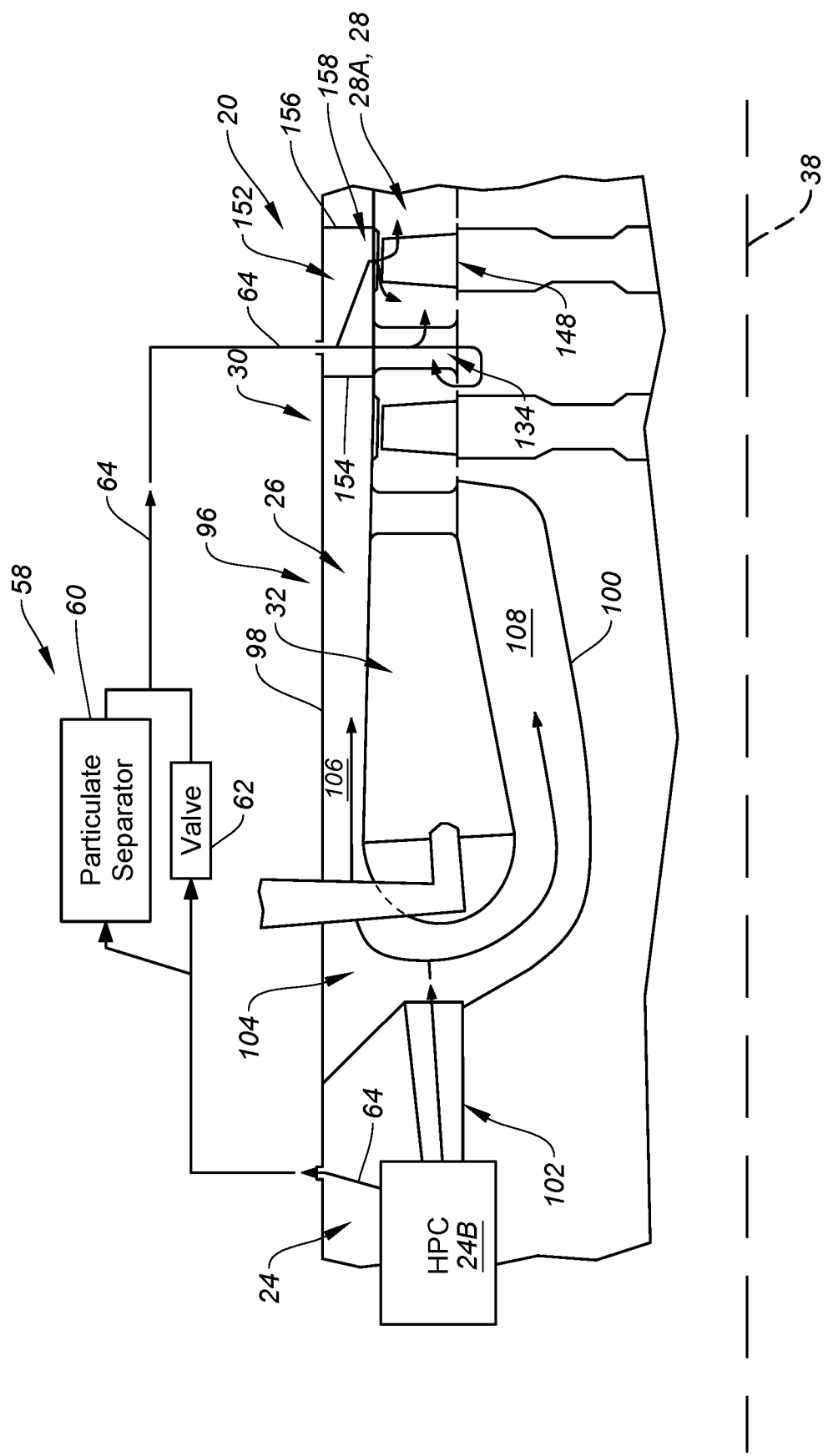
FIG. 9 schematically illustrates a cutaway view of the gas turbine engine of FIG. 1 including another exemplary configuration of the particulate separator assembly of FIG. 2, in accordance with one or more embodiments of the present disclosure.

FIG. 9 illustrates another exemplary configuration of the particulate separator assembly 58 for the gas turbine engine 20. FIG. 9 illustrates a cutaway view of portions of the compressor section 24, the combustor section 26, and the turbine section 28. The engine static structure 30 of FIG. 9 includes the engine case assembly 96. The engine case assembly 96 of FIG. 9 includes the outer diffuser case 98 and the inner diffuser case 100 disposed radially inward of the outer diffuser case 98. Each of the outer diffuser case 98 and the inner diffuser case 100 extends circumferentially about (e.g., completely around) the axial centerline 38. The outer diffuser case 98 and the inner diffuser case 100 form the annular diffuser nozzle 102. The outer diffuser case 98 and the inner diffuser case 100 form the annular air plenum 104 surrounding the combustor 32. The diffuser nozzle 102 directs the compressed air flow 64 into the air plenum 104 (e.g., the outer plenum portion 106 and the inner plenum portion 108) for introduction into the combustor 32.

The particulate separator assembly 58 of FIG. 9 includes the particulate separators 60 and the bypass valves 62 disposed outside (e.g., radially outside) the engine case assembly 96 (e.g., the outer diffuser case 98). For example, the particulate separators 60 and the bypass valves 62 may be disposed outside of the gas turbine engine 20 (e.g., outside the engine static structure 30). The particulate separators 60 and the bypass valves 62 may be circumferentially distributed about the engine case assembly 96 (e.g., relative to the axial centerline 38). The particulate separators 60 and the bypass valves 62 are connected in fluid communication with an annular cavity 152 of the turbine section 28. The annular cavity 152 may extend circumferentially about (e.g., completely around) the axial centerline 38. The annular cavity 152 may be disposed between and formed by the engine case assembly 96 and the high-pressure turbine 28A. For example, the annular cavity 152 may be positioned between (e.g., radially between) the engine case assembly 96 and the high-pressure turbine 28A. The annular cavity 152 may be further formed by a forward wall 154 and an aft wall 156 of the engine case assembly 96. Each of the forward wall 154 and the aft wall 156 may extend circumferentially about (e.g., completely around) the axial centerline 38 between (e.g., radially between) the engine case assembly 96 and the high-pressure turbine 28A.

In operation, the compressed air flow 64 (e.g., compressor bleed air) is directed from an intermediate stage of the high-pressure compressor 24B to the particulate separators 60 where particulate is separated from the compressed air flow 64 by the particulate separators 60. The compressed air flow 64 is directed from the particulate separators 60 and/or the bypass valves 62 to the annular cavity 152. The compressed air flow 64 may be directed from the annular cavity 152 into a BOAS 158 for the second rotor blade stage 148 and/or the second vane stage 134 at a plurality of circumferential positions. The BOAS 158 of FIG. 8 is disposed radially outward of the second rotor blade stage 148. The compressed air flow 64 may be directed through internal segments of the BOAS 158 to provide cooling for the BOAS 158. The compressed air flow 64 may flow through the second vane stage 134. For example, the compressed air flow 64 may flow through internal passages of fixed vanes of the second vane stage 134 and may be directed out of the vanes through cooling holes formed through the vanes, thereby providing cooling for the second vane stage 134. Components of the particulate separator assembly 58, such as the particulate separators 60 and the bypass valves 62, may be connected in fluid communication by any suitable conduit (e.g., pipe, hose, tube, passage, etc.), manifold, or other fluid conveying component to direct the compressed air flow 64 through the particulate separator assembly 58, as described above.

Figure 10:
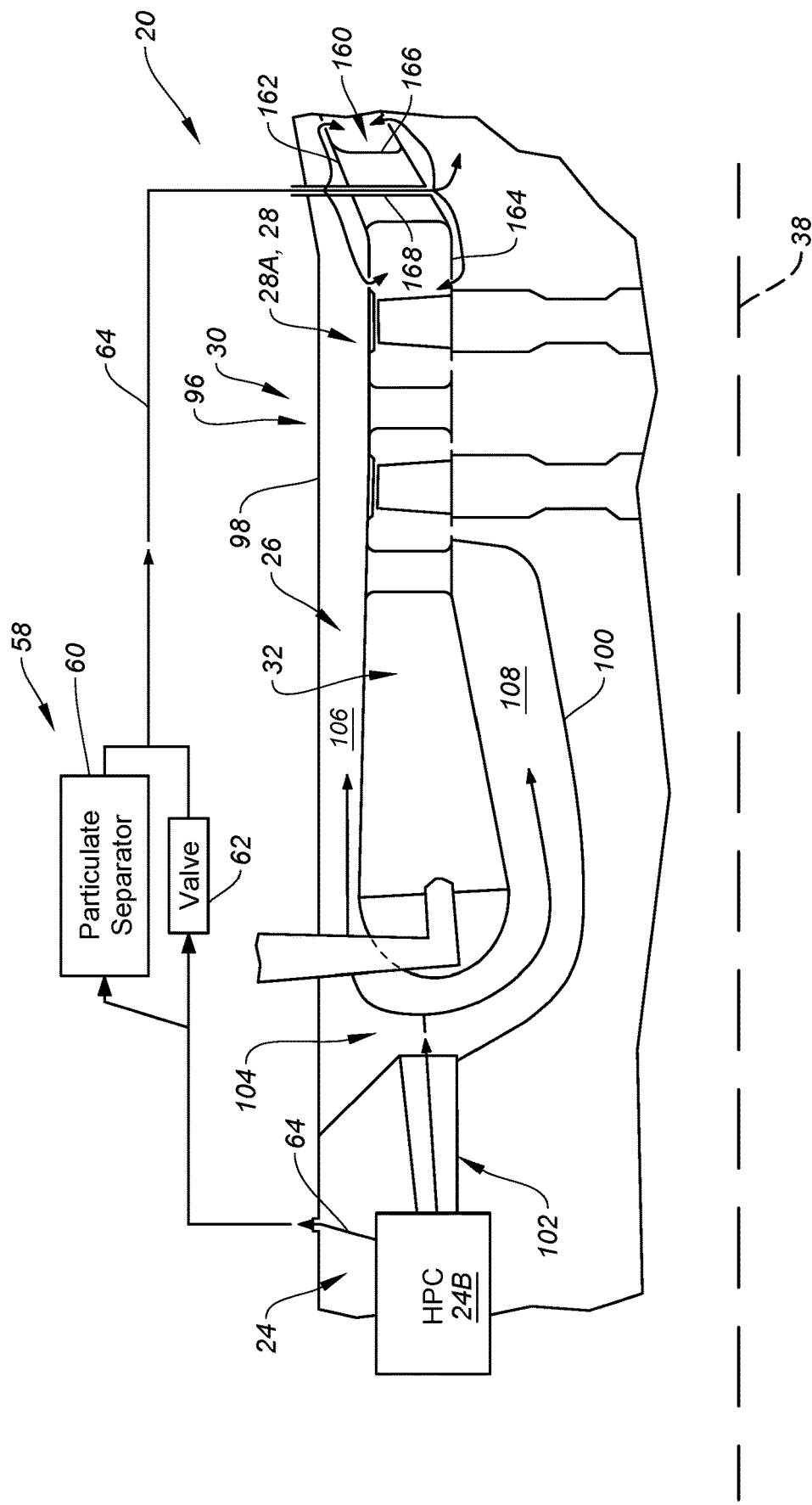
FIG. 10 schematically illustrates a cutaway view of the gas turbine engine of FIG. 1 including another exemplary configuration of the particulate separator assembly of FIG. 2, in accordance with one or more embodiments of the present disclosure.

FIG. 10 illustrates another exemplary configuration of the particulate separator assembly 58 for the gas turbine engine 20. FIG. 10 illustrates a cutaway view of portions of the compressor section 24, the combustor section 26, and the turbine section 28. The engine static structure 30 of FIG. 10 includes the engine case assembly 96 and a mid-turbine frame (MTF) 160. The engine case assembly 96 of FIG. 10 includes the outer diffuser case 98 and the inner diffuser case 100 disposed radially inward of the outer diffuser case 98. Each of the outer diffuser case 98 and the inner diffuser case 100 extends circumferentially about (e.g., completely around) the axial centerline 38. The outer diffuser case 98 and the inner diffuser case 100 form the annular diffuser nozzle 102. The outer diffuser case 98 and the inner diffuser case 100 form the annular air plenum 104 surrounding the combustor 32. The diffuser nozzle 102 directs the compressed air flow 64 into the air plenum 104 (e.g., the outer plenum portion 106 and the inner plenum portion 108) for introduction into the combustor 32. The MTF 160 is disposed between and connecting the high-pressure turbine 28A and the low-pressure turbine 28B (see FIG. 1). The MTF 160 may be used to structurally support one or more engine bearing assemblies and to transfer bearing loads to the engine case assembly 96. The MTF 160 of FIG. 10 includes an outer annular case 162, an inner annular case 164, and a plurality of struts 166 interconnecting the outer annular case 162 and the inner annular case 164. The MTF 160 may additionally include a plurality of air conduits 168. All or a subset of the struts 166 may be hollow and/or may include one of the air conduits 168. As shown in FIG. 10, for example, the air conduit 168 may extend through the engine case assembly 96, the outer annular case 162, the inner annular case 164, and a respective one of the struts 166.

The particulate separator assembly 58 of FIG. 10 includes the particulate separators 60 and the bypass valves 62 disposed outside (e.g., radially outside) the engine case assembly 96 (e.g., the outer diffuser case 98). For example, the particulate separators 60 and the bypass valves 62 may be disposed outside of the gas turbine engine 20 (e.g., outside the engine static structure 30). The particulate separators 60 and the bypass valves 62 may be circumferentially distributed about the engine case assembly 96 (e.g., relative to the axial centerline 38). The particulate separators 60 and the bypass valves 62 of FIG. 10 are connected in fluid communication with each of the air conduits 168.

In operation, the compressed air flow 64 (e.g., compressor bleed air) is directed from an intermediate stage of the high-pressure compressor 24B to the particulate separators 60 where particulate is separated from the compressed air flow 64 by the particulate separators 60. The compressed air flow 64 is directed from the particulate separators 60 and/or the bypass valves 62 to the air conduits 168. The compressed air flow 64 may be directed through the air conduits 168 to portions of the MTF 160. For example, the compressed air flow 64 may be directed to portions of the outer annular case 162 and/or the inner annular case 164 to provide cooling for the MTF 160. Components of the particulate separator assembly 58, such as the particulate separators 60 and the bypass valves 62, may be connected in fluid communication by any suitable conduit (e.g., pipe, hose, tube, passage, etc.), manifold, or other fluid conveying component to direct the compressed air flow 64 through the particulate separator assembly 58, as described above.

Figure 11:
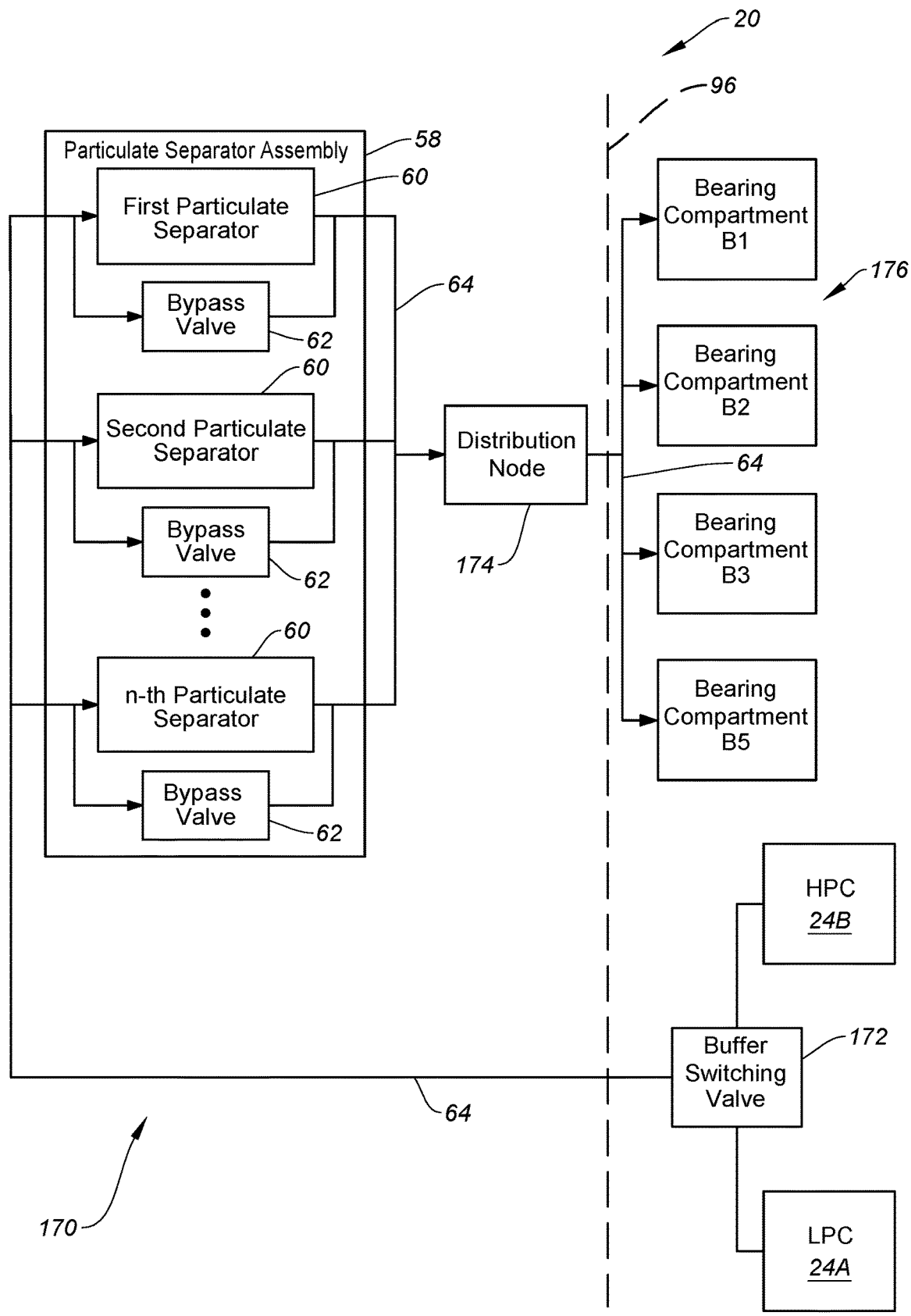
FIG. 11 schematically illustrates a buffer air assembly for the gas turbine engine of FIG. 1 and the buffer air assembly includes the particulate separator assembly of FIG. 2, in accordance with one or more embodiments of the present disclosure.

FIG. 11 illustrates another exemplary configuration of the particulate separator assembly 58 for the gas turbine engine 20. FIG. 11 schematically illustrates a buffer air assembly 170 for supplying the compressed air flow 64 (e.g., buffer air) to one or more bearing compartments of the gas turbine engine 20 (e.g., bearing compartments for the first shaft 40 and/or the second shaft 46; see FIG. 1) to facilitate the operation of bearing compartment seals, thereby providing sealing for the bearing compartment. For example, the buffer air may be directed to the bearing compartment to ensure a sufficiently positive differential pressure across the bearing compartment seals to prevent oil leakage ("weepage") from the bearing compartment.

The buffer air assembly 170 of FIG. 11 includes the particulate separator assembly 58, a buffer switching valve 172, a distribution node 174, and one or more bearing compartments 176. The buffer switching valve 172 is connected in fluid communication with the low-pressure compressor 24A and the high-pressure compressor 24B. For example, the buffer switching valve 172 may be connected in fluid communication with an intermediate stage or discharge of the low-pressure compressor 24A and the high-pressure compressor 24B. The buffer switching valve 172 is further connected in fluid communication with the particulate separator assembly 58. The buffer switching valve 172 is selectively positionable to direct the compressed air flow 64 to the particulate separator assembly 58 from the low-pressure compressor 24A or the high-pressure compressor 24B. The particulate separator assembly 58 of FIG. 11 includes the particulate separators 60 and the bypass valves 62 disposed outside (e.g., radially outside) the engine case assembly 96 (e.g., the outer diffuser case 98). For example, the particulate separators 60 and the bypass valves 62 may be disposed outside of the gas turbine engine 20 (e.g., outside the engine static structure 30). The particulate separators 60 and the bypass valves 62 may be circumferentially distributed about the engine case assembly 96 (e.g., relative to the axial centerline 38). The distribution node 174 is connected in fluid communication with the particulate separators 60 to receive the cleaned compressed air flow 64 from the particulate separators 60. The distribution node 174 is connected in fluid communication with the bearing compartments 176 and distributes the cleaned compressed air flow 64 to the bearing compartments 176 for air buffering.

Figure 12:
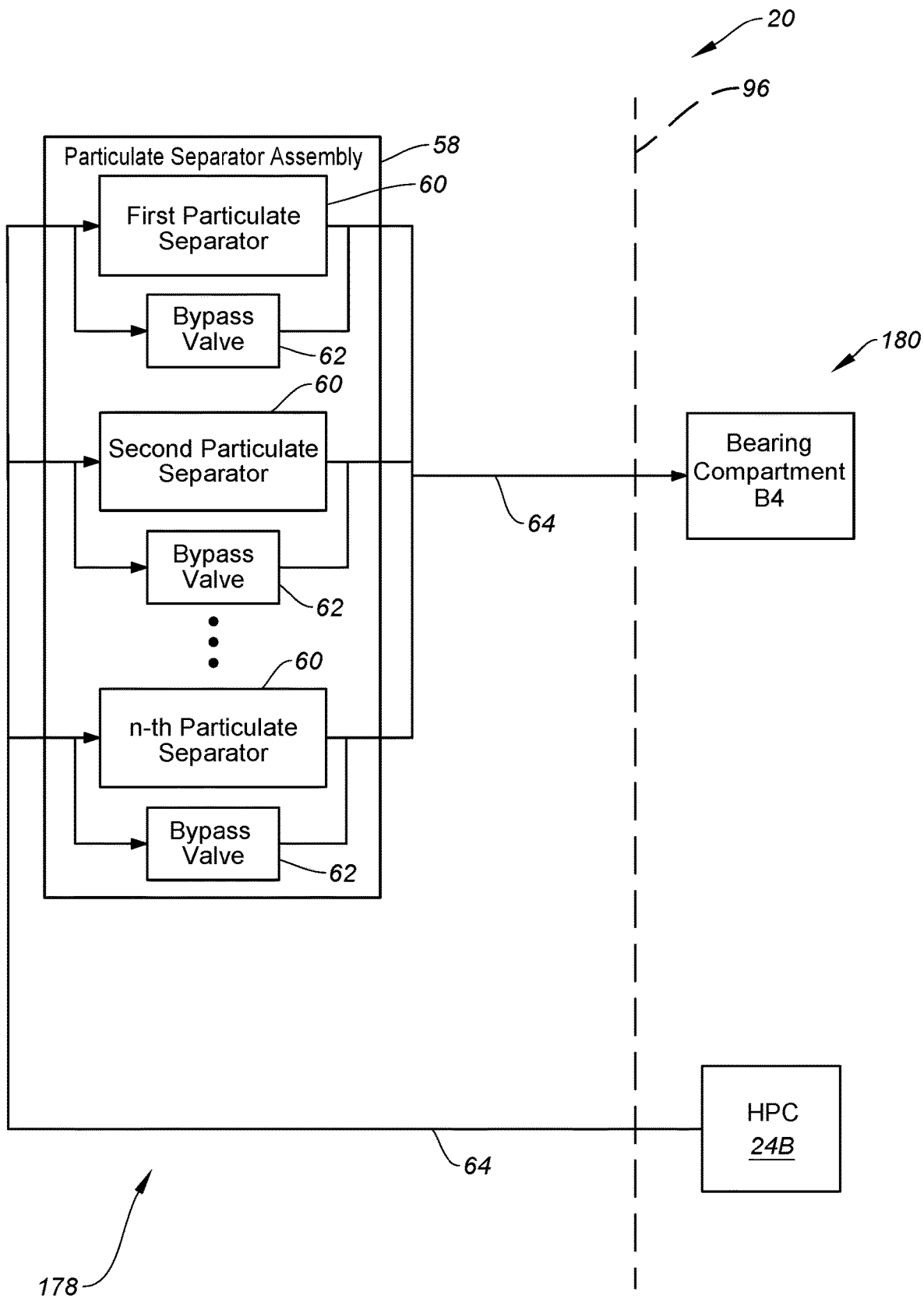
FIG. 12 schematically illustrates another buffer air assembly for the gas turbine engine of FIG. 1 and the buffer air assembly includes the particulate separator assembly of FIG. 2, in accordance with one or more embodiments of the present disclosure.

FIG. 12 illustrates another exemplary configuration of the particulate separator assembly 58 for the gas turbine engine 20. FIG. 12 schematically illustrates another buffer air assembly 178 for supplying the compressed air flow 64 (e.g., buffer air) to one or more bearing compartments of the gas turbine engine 20 (e.g., bearing compartments for the first shaft 40).

The buffer air assembly 178 of FIG. 12 includes the particulate separator assembly 58 and one or more bearing compartments 180. The particulate separator assembly 58 of FIG. 12 includes the particulate separators 60 and the bypass valves 62 disposed outside (e.g., radially outside) the engine case assembly 96 (e.g., the outer diffuser case 98). For example, the particulate separators 60 and the bypass valves 62 may be disposed outside of the gas turbine engine 20 (e.g., outside the engine static structure 30). The particulate separators 60 and the bypass valves 62 may be circumferentially distributed about the engine case assembly 96 (e.g., relative to the axial centerline 38). The particulate separator assembly 58 (e.g., the particulate separators 60 and the bypass valves 62) is connected in fluid communication with an intermediate stage or discharge of the high-pressure compressor 24B. The particulate separator assembly 58 is configured to receive the compressed air flow 64 from the high-pressure compressor 24B and direct the cleaned compressed air flow 64 to the bearing compartments 180 for air buffering.

Embodiments of the particulate separator assembly 58 described herein may be used in combination to separate particulate from a compressed air flow (e.g., the compressed air flow 64) and supply the cleaned compressed air flow to a plurality of the compressed air loads 66. For example, the particulate separator assembly 58 may be configured to supply the compressed air flow 64 to one, or more, or all of the compressed air loads described herein and, for example, those illustrated in FIGS. 4-12.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. An assembly for a gas turbine engine of an aircraft propulsion system, the assembly comprising:
   at least one rotational assembly configured for rotation about an axis, the at least one rotational assembly includes a shaft, a bladed compressor rotor, and a bladed turbine rotor, and the shaft interconnects the bladed compressor rotor and the bladed turbine rotor;
   an engine static structure including an engine case assembly, the engine case assembly extends circumferentially about the axis, and the engine case assembly surrounds the at least one rotational assembly;
   a compressor including the bladed compressor rotor, and the compressor is configured to form a compressed air flow;
   a combustor;
   one or more compressed air loads disposed within the engine case assembly, and the one or more compressed air loads are connected in fluid communication with the compressor to receive the compressed air flow; and
   a particulate separator assembly including at least one particulate separator, the at least one particulate separator is disposed outside of the engine case assembly, the at least one particulate separator are connected in fluid communication with and between the compressor and the one or more compressed air loads, and the at least one particulate separator is configured to separate particulate from the compressed air flow and direct the compressed air flow to the one or more compressed air loads,
   wherein:
   the engine case assembly includes an outer diffuser case and an inner diffuser case, the outer diffuser case and the inner diffuser case form an annular air plenum surrounding the combustor, the annular air plenum includes an outer plenum portion and an inner plenum portion, the outer plenum portion is disposed radially outward of the combustor, the inner plenum portion is disposed radially inward of the combustor; and
   the at least one particulate separator is connected in fluid communication with the compressor through the outer plenum portion.

2. The assembly of claim 1, wherein the particulate separator assembly further includes at least one bypass valve, each bypass valve of the at least one bypass valve is selectively positionable in an open position and a closed position, and, in the open position, each bypass valve is configured to direct at least a portion of the compressed air flow to bypass a respective particulate separator of the at least one particulate separator.

3. The assembly of claim 1, wherein each particulate separator of the at least one particulate separator is a particulate air filter.

4. The assembly of claim 1, wherein each particulate separator of the at least one particulate separator includes a housing, the housing forms an inlet, an outlet, and a settling chamber between the inlet and the outlet.

5. The assembly of claim 1, wherein each particulate separator of the at least one particulate separator includes a housing, the housing forms an inlet, an outlet, and a serpentine passage between the inlet and the outlet.

6. The assembly of claim 1, wherein each particulate separator of the at least one particulate separator includes a curved conduit, the curved conduit includes an inlet, an inner diameter outlet, and an outer diameter outlet, and the compressed air flow is directed to the one or more compressed air loads from the inner diameter outlet.

7. The assembly of claim 1, further comprising a turbine including the bladed turbine rotor;
wherein the one or more compressed air loads includes a rotor blade stage of the bladed turbine rotor.

8. The assembly of claim 1, further comprising a turbine including the bladed turbine rotor;
wherein the one or more compressed air loads includes a vane stage of the turbine.

9. The assembly of claim 1, further comprising a turbine including the bladed turbine rotor;
wherein the one or more compressed air loads includes a blade outer air seal (BOAS) of the turbine for the bladed turbine rotor.

10. The assembly of claim 1, wherein the outer diffuser case and the inner diffuser case form an annular diffuser nozzle configured to direct the compressed air flow into the annular air plenum, the annular diffuser nozzle includes a plurality of hollow struts, and the compressed air flow is directed from the at least one particulate separator to the one or more compressed air loads through the plurality of hollow struts.

11. The assembly of claim 10, wherein the inner diffuser case forms an annular cavity separated from the annular air plenum, and the compressed air flow is directed from the plurality of hollow struts to the one or more compressed air loads through the annular cavity.

12. The assembly of claim 1, further comprising a turbine including the bladed turbine rotor;
wherein the engine static structure further includes a mid-turbine frame connected to the turbine, and the one or more compressed air loads includes the mid-turbine frame.

13. The assembly of claim 1, further comprising at least one bearing compartment, and the one or more compressed air loads includes the at least one bearing compartment.

14. The assembly of claim 1, wherein the at least one particulate filter includes a plurality of particulate filters, and the plurality of particulate filters are circumferentially distributed about the engine case assembly.

15. The assembly of claim 1, wherein the at least one particulate filter is disposed outside of the gas turbine engine.

16. An assembly for a gas turbine engine of an aircraft propulsion system, the assembly comprising:
at least one rotational assembly, the at least one rotational assembly is configured for rotation about an axis, the at least one rotational assembly includes a shaft, a bladed compressor rotor, and a bladed turbine rotor, and the shaft interconnects the bladed compressor rotor and the bladed turbine rotor;
a compressor including the bladed compressor rotor, and the compressor is configured to form a compressed air flow;
a turbine including the bladed turbine rotor, and the turbine includes at least one rotor blade stage of the bladed turbine rotor;
an engine static structure including an engine case assembly, the engine case assembly extends circumferentially about the axis, the engine case assembly surrounds the at least one rotational assembly, the engine case assembly includes an outer diffuser case and an inner diffuser case, the outer diffuser case and the inner diffuser case form an annular air plenum surrounding the combustor, the annular air plenum includes an outer plenum portion and an inner plenum portion, the outer plenum portion is disposed radially outward of the combustor, and the inner plenum portion is disposed radially inward of the combustor; and
a particulate separator assembly including a plurality of particulate separators, the plurality of particulate separators are disposed outside of the engine case assembly, the plurality of particulate separators are connected in fluid communication with and between the outer plenum portion and the at least one rotor blade stage, the plurality of particulate separators are configured to receive the compressed air flow from the outer plenum portion, separate particulate from the compressed air flow, and direct the compressed air flow to the at least one rotor blade stage.

17. The assembly of claim 16, wherein the at least one particulate filter is disposed outside of the gas turbine engine.

18. An assembly for a gas turbine engine of an aircraft propulsion system, the assembly comprising:
at least one rotational assembly configured for rotation about an axis, the at least one rotational assembly includes a shaft, a bladed compressor rotor, and a bladed turbine rotor, and the shaft interconnects the bladed compressor rotor and the bladed turbine rotor;
an engine static structure including an engine case assembly, the engine case assembly extends circumferentially about the axis, the engine case assembly forms an exterior of the gas turbine engine, the engine case assembly forms an annular bypass flowpath radially outside of the engine case assembly, and the engine case assembly surrounds the at least one rotational assembly;
a compressor including the bladed compressor rotor, and the compressor is configured to form a compressed air flow;
a combustor;
one or more compressed air loads disposed within the engine case assembly, and the one or more compressed air loads are connected in fluid communication with the compressor to receive the compressed air flow; and
a particulate separator assembly including a particulate separator, the particulate separator is disposed outside of the engine static structure, the particulate separator is connected in fluid communication with and between the compressor and the one or more compressed air loads, and the particulate separator is configured to separate particulate from the compressed air flow and direct the compressed air flow to the one or more compressed air loads,
wherein:
the engine case assembly includes an outer diffuser case and an inner diffuser case, the outer diffuser case and the inner diffuser case form an annular air plenum surrounding the combustor, the annular air plenum includes an outer plenum portion and an inner plenum portion, the outer plenum portion is disposed radially outward of the combustor, the inner plenum portion is disposed radially inward of the combustor; and
the particulate separator is connected in fluid communication with the compressor through the outer plenum portion.

* * * * *